(12) United States Patent
Berman et al.

(10) Patent No.: US 8,717,892 B2
(45) Date of Patent: May 6, 2014

(54) FULL CHANNEL-SWAP CROSSBAR

(75) Inventors: Mark Berman, Newport Coast, CA (US); Manolito M. Catalasan, Mission Viejo, CA (US); Bruce Conway, Aliso Viejo, CA (US); Kevin T. Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 789 days.

(21) Appl. No.: 11/819,744

(22) Filed: Jun. 28, 2007

(65) Prior Publication Data

US 2008/0013457 A1    Jan. 17, 2008

Related U.S. Application Data

(63) Continuation-in-part of application No. 10/612,729, filed on Jul. 2, 2003, and a continuation-in-part of application No. 10/612,025, filed on Jul. 2, 2003.

(60) Provisional application No. 60/905,815, filed on Mar. 9, 2007.

(51) Int. Cl.
*H04J 3/16* (2006.01)

(52) U.S. Cl.
USPC .......................... 370/235; 370/437; 370/463

(58) Field of Classification Search
USPC ......... 370/230, 235, 242, 244, 245, 250, 252, 370/431, 421, 438, 437, 445, 463; 709/250
See application file for complete search history.

(56) References Cited

U.S. PATENT DOCUMENTS

| | | | | |
|---|---|---|---|---|
| 5,923,663 | A * | 7/1999 | Bontemps et al. | 370/445 |
| 6,065,073 | A * | 5/2000 | Booth | 710/46 |
| 6,141,350 | A * | 10/2000 | Mahale et al. | 370/438 |
| 6,175,865 | B1 | 1/2001 | Dove et al. | |
| 6,243,426 | B1 * | 6/2001 | Lo et al. | 375/289 |
| 6,661,805 | B1 * | 12/2003 | Romano et al. | 370/450 |
| 6,684,347 | B1 | 1/2004 | Coffey | |
| 7,127,624 | B2 | 10/2006 | Berman et al. | |
| 7,271,641 | B1 | 9/2007 | Roo | |
| 7,292,596 | B1 | 11/2007 | Campana et al. | |
| 2004/0252055 | A1 * | 12/2004 | Thomas et al. | 342/372 |
| 2005/0002328 | A1 | 1/2005 | Chan | |
| 2005/0021734 | A1 | 1/2005 | Chan | |

FOREIGN PATENT DOCUMENTS

EP      0863640 A      9/1998

OTHER PUBLICATIONS

Huang et al., "Simulated Performance of 1000BASE-T Receiver with Different Analog Front End Designs," Solid-State Circuits Research Laboratory, Department of Electrical and Computer Engineering, University of California, Davis, Davis, California, Conference Record of "Thirty-Fifth Asilomar Conference on Signals, Systems, and Computers," Nov. 2001, IEEE, pp. 617-620 (6 pages total).

* cited by examiner

*Primary Examiner* — Yemane Mesfin
*Assistant Examiner* — Mon Cheri Davenport
(74) *Attorney, Agent, or Firm* — Sterne, Kessler, Goldstein & Fox P.L.L.C.

(57) ABSTRACT

A programmable channel-swap crossbar switch for swapping signal flow from one channel to another within an Ethernet physical layer device (PHY) is presented. The crossbar switch includes two or more programmed multiplexers, each multiplexer configured to receive two or more input signals and to select which one of the input signals to pass to a programmed corresponding channel, such that a first input signal associated with a first channel can be swapped to a second channel as operating conditions necessitate. The crossbar switch can be used for Ethernet communications with various communication speeds, such as 10BaseT, 100BaseT, and Gigabit communications. A crossbar switch can be used in both a transmit path and a receive path. Two crossbar switches may be used in a receive path in order to undo channel swapping for control signal processing. A method of channel-swapping in an Ethernet PHY communications system is also presented.

28 Claims, 22 Drawing Sheets

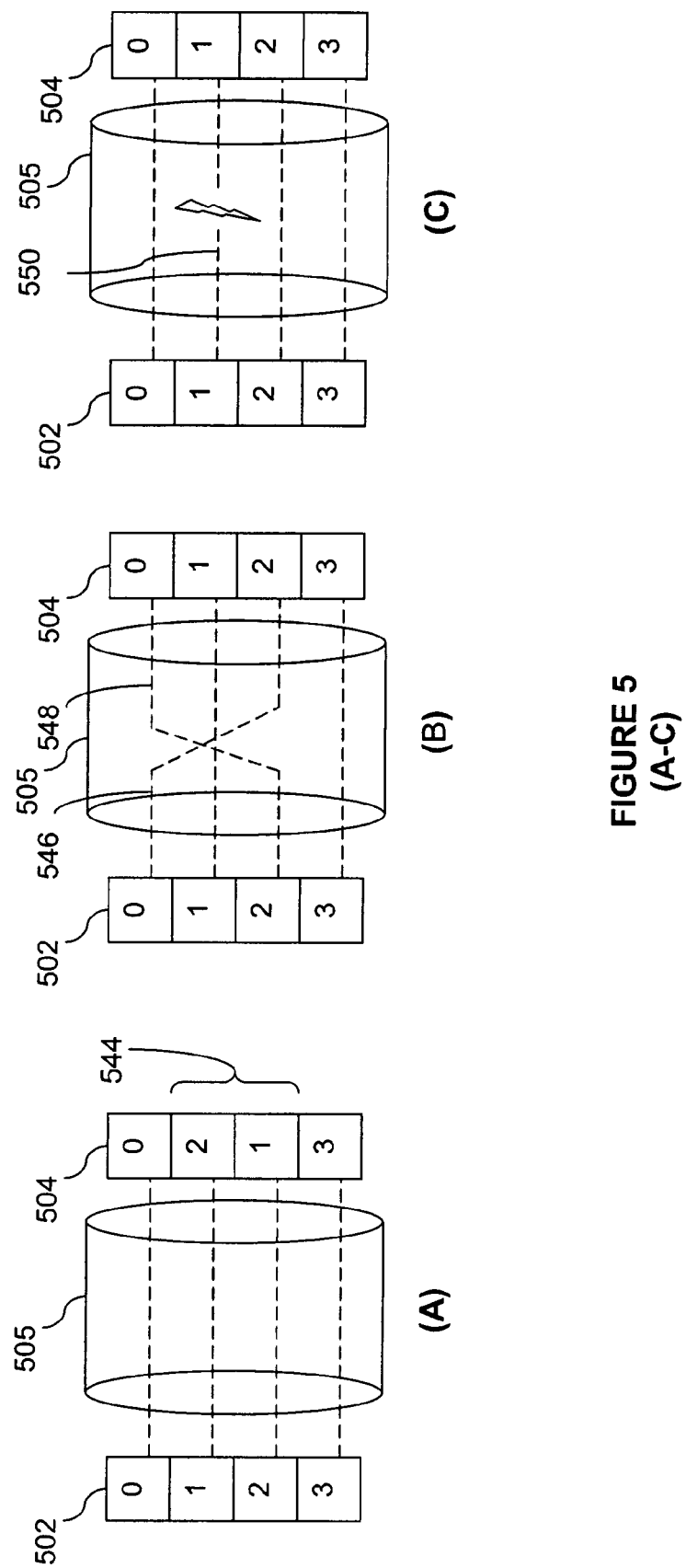
FIGURE 5 (A-C)

(D)

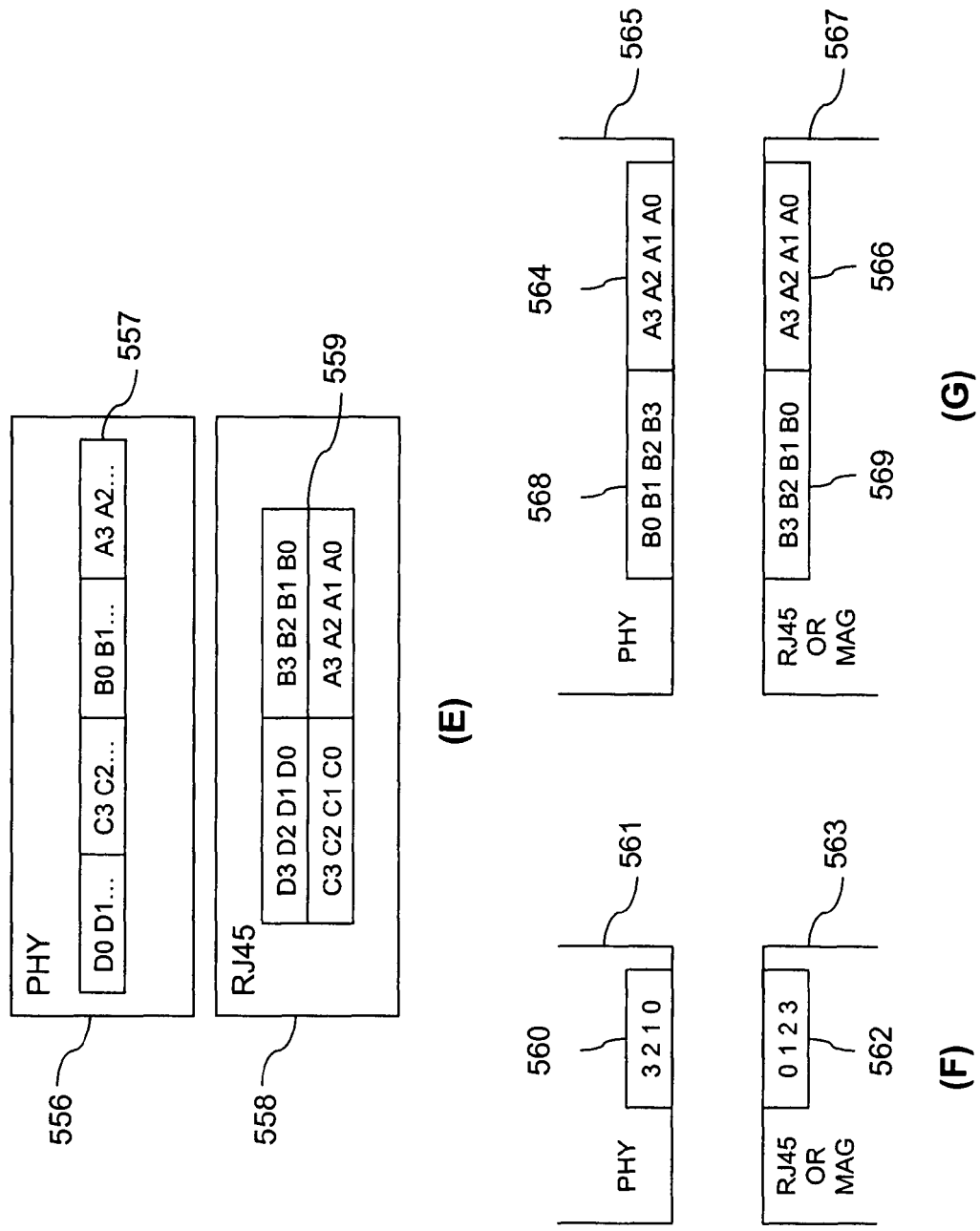
FIGURE 5 (E-G)

FULL CHANNEL-SWAP CROSSBAR

CROSS REFERENCE TO RELATED APPLICATIONS

This application is a continuation-in-part of U.S. patent application Ser. Nos. 10/612,729 and 10/612,025, both filed on Jul. 2, 2003, which are incorporated by reference herein in their entireties. This application also claims benefit of U.S. Provisional Patent Appl. No. 60/905,815, filed on Mar. 9, 2007, which is incorporated by reference herein in its entirety.

BACKGROUND OF THE INVENTION

1. Field of the Invention

The present invention generally relates to Ethernet physical layer device (PHY) communications systems, and more specifically to channel designation within such a system.

2. Related Art

A conventional Ethernet communications system includes an Ethernet PHY device having a transceiver that can transmit signals or data over a wire or cable to another Ethernet PHY device that receives the transmitted signals or data. The transmitting PHY typically converts a digital signal to an analog signal (e.g., using a digital-to-analog converter (DAC)) prior to providing the signal to the cable. The receiving PHY typically converts the received analog signal back to a digital signal (e.g., using an analog-to-digital converter). The cable is typically an unshielded twisted-pair cable (usually copper) that typically contains four twisted pairs within its sheath. The PHYs and cable are capable of transmitting and receiving the signals or data at a wide range of different speeds, including the typical 10BaseT, 100BaseT, and 1000BaseT (Gigabit) speeds.

The twisted pairs of a cable correspond to channels. Therefore, in a cable with four twisted pairs, there are four channels. In both 10BaseT and 100BaseT communications, transmission is done on one twisted pair (i.e., a first channel), and reception is done on another twisted pair (i.e., a second channel), leaving two channels unused. With Gigabit communications, however, there is simultaneous bidirectional transmission over all four channels. Therefore, with Gigabit communications, channel ordering is extremely important. Any misinterpretation of the channel order can cause a failure in link.

However, various problems can occur that will impede or prevent the proper functioning of a conventional Ethernet communications system as just described. These problems include a variety of cable impairments, board-level miswiring, or even intentional design practices. One example is that a wire inside the cable could be broken, leaving no connection on that twisted pair between a transmitting PHY and a receiving PHY on the other side. As a second example, the wiring inside of the cable could be incorrect. For instance, channel 1 of a transmitting PHY is expected to be connected to channel 1 of a receiving PHY, but is instead connected to channel 2. As a third example, a customer's or user's expectations with regard to chip pinout or connector placement for each channel could be erroneous, possibly making it necessary to rewire the user's board, which can be costly.

The consequences of miscoupling PHY interfaces in a communications system could result in an inoperable system, system failure, or malfunctioning or damaged equipment. In an effort to prevent or mitigate the effects of these occurrences, various solutions have been implemented. These solutions include automatic media dependent interface (MDI) crossover (auto-MDIX), Ethernet@wirespeed, and cable diagnostics.

Auto-MDIX can be used in a typical four-pair system to detect and reconfigure the order of either pairs 1 and 2 or pairs 3 and 4. Auto-MDIX can be useful in eliminating the need for crossover cables that may be utilized between two computers, for example. A drawback of auto-MDIX, however, is that since auto-MDIX is limited to reconfiguring only pairs 1 and 2 or pairs 3 and 4, it cannot handle other wiring configuration combinations. For example, auto-MDIX would not be able to correct coupling involving pairs 1 and 3, 1 and 4, 2 and 3, or 2 and 4. Auto-MDIX is also not useful when one of the two main cable pairs is physically impaired (e.g., by a short or open circuit). Auto-MDIX is used throughout the industry, but may have other various names.

Ethernet@wirespeed provides an algorithm that can detect conditions on a cable or at a PHY, and can alter a transmission that cannot be supported under the detected conditions. For example, Ethernet@wirespeed can automatically reduce a transmission speed (e.g., from 1000BaseT to 10/100BaseT) when optimal transmission cannot be maintained due to detected channel impairments. Ethernet@wirespeed is useful when channel characteristics have degraded but the channel is still required for providing communication. Drawbacks of Ethernet@wirespeed are that it cannot operate on a broken or damaged twisted pair, and it does not have the capability to reconfigure wire pairs in order to utilize other good pairs within the cable. For example, even though pair 3 or pair 4 may be unused, if pair 1 or pair 2 is damaged or broken, Ethernet@wirespeed does not have the capability to reconfigure pair 3 or pair 4 for communication.

Cable diagnostics can provide information pertaining to the characteristics and quality of a cable. For example, cable diagnostics can detect an open, short, or proper termination on the cable. In addition, cable diagnostics can determine the cable length and can provide information regarding the location of an impedance mismatch in the cable. However, cable diagnostics do not have the capability to determine whether the cable has been incorrectly installed. For example, cable diagnostics will not be able to detect or report that pair 1 has been swapped with pair 3. Thus, cable diagnostics may report that everything is satisfactory, even if pair 1 has been swapped with pair 3.

What is needed are Ethernet PHY communications system implementations that allow for correction of the miscoupling and/or misconfiguration of Ethernet PHY interfaces while overcoming the limitations of previous solutions.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

The following describes a full channel-swap crossbar for use in an Ethernet PHY communications system that provides a way to easily correct for miscoupling and/or misconfiguration of Ethernet PHY interfaces.

U.S. patent application Ser. No. 10/612,025 (entitled, "Method And System For Secure Automatic Media Dependent Interface Reconfiguration And Repair") and Ser. No. 10/612,729 (entitled, "Method And System For Automatic Media Dependent Interface Reconfiguration And Repair"), both filed Jul. 2, 2003, provide general solutions to the problem of how to allow a single Ethernet PHY to be as configurable as possible with respect to the media channels on which it operates. U.S. patent application Ser. Nos. 10/612,729 and 10/612,025 are incorporated by reference herein in their entireties. The following description provides hardware implementation embodiments that complement the general solutions of these incorporated applications.

Figure 1:
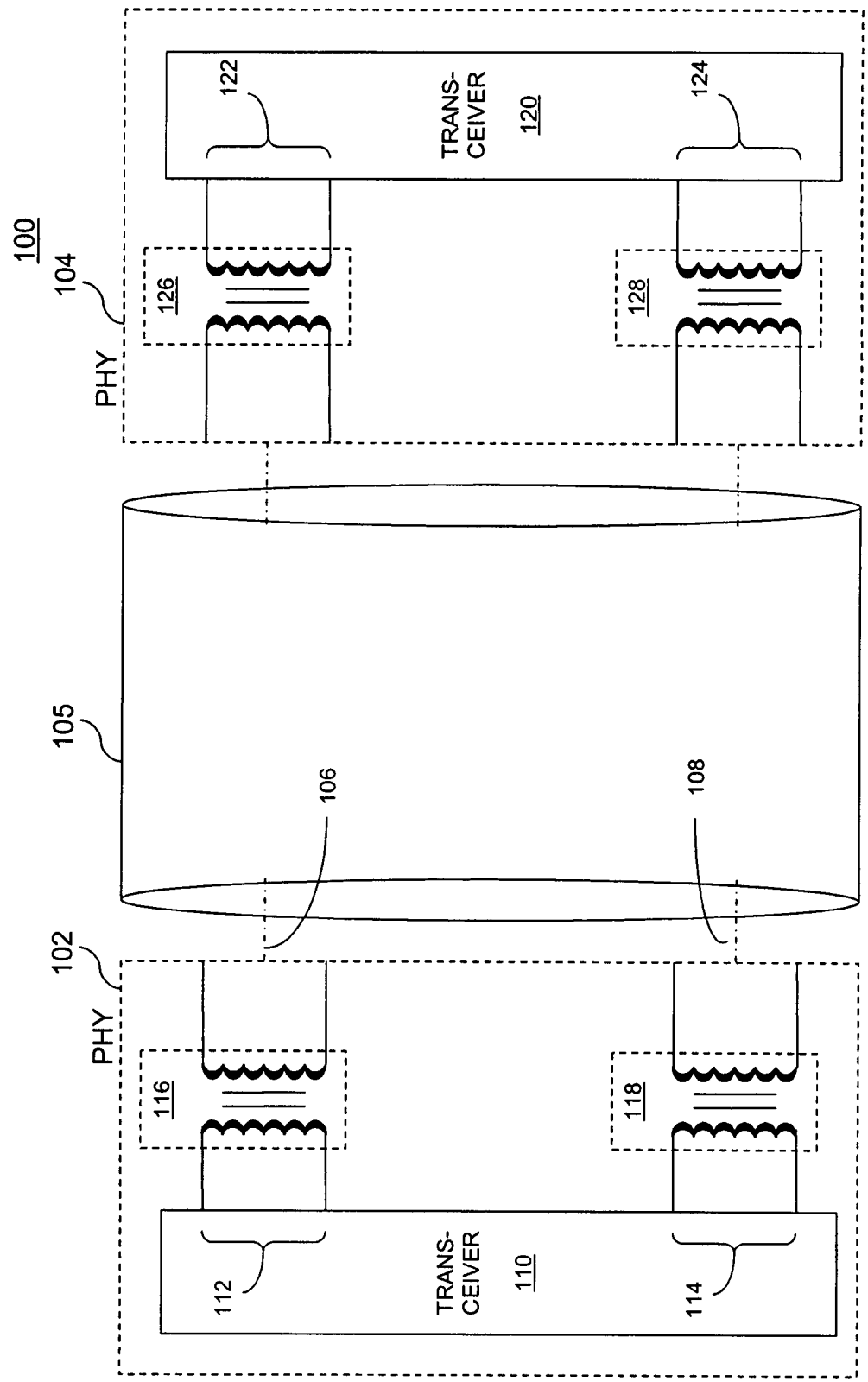
FIGS. 1-3 are block diagrams of conventional Ethernet physical layer device (PHY) communications system architectures.

FIG. 1 illustrates a conventional Ethernet PHY communications system 100, with a first PHY device 102 connected to a second PHY device 104 by communication links 106/108. System 100 can be used to transmit communications such as data and power. The first PHY device 102 includes a transceiver 110, and also includes transformers 116 and 118 that provide for transport of communication signals between communication links 106/108 and transceiver 110. The second PHY device 104 likewise includes a transceiver 120, and also includes transformers 126 and 128 that provide for transport of communication signals between communication links 106/108 and transceiver 120. Transformers 116, 118, 126, and 128 are passive electrical components (magnetics modules) that convert electrical signals from one level to another as well as provide electrical isolation of the cable from the chip. Each PHY device 102/104 typically includes one or more DACs (not shown) to convert digital signals to analog signals prior to transmitting on communication links 106/108. Likewise, each PHY device 102/104 typically includes one or more ADCs (not shown) to convert analog signals to digital signals once the signals are received from communication links 106/108. Communication links 106/108 can each represent, for example, a twisted pair of an unshielded twisted-pair cable 105, such as a CAT-5 cable using a 10, 100, or 1000BaseT Fast Ethernet standard.

As it appears in FIG. 1, communication link 106 represents a first channel connecting a first channel port 112 of the first PHY 102 to a first channel port 122 of the second PHY 104. Likewise, it appears that communication link 108 represents a second channel connecting a second channel port 114 of the first PHY 102 to a second channel port 124 of the second PHY 104. However, it could, instead, be that communication link 106 connects the first channel port 112 to the second channel port 124, and that communication link 108 connects the second channel port 114 to the first channel port 122 (see Ethernet PHY communications system 200 of FIG. 2). This could be the case, for example, if the cable represented by communication links 106/108 is actually a crossover cable. For example, transmission from the first PHY 102 to the second PHY 104 can be accomplished from a first channel port (e.g., channel port 112) over wire 230 to a second channel port (e.g., channel port 124). Likewise, in the crossover cable example, transmission from the second PHY 104 to the first PHY 102 can be accomplished from a first channel port (e.g., channel port 122) over wire 232 to a second channel port (e.g., channel port 114).

Figure 2:
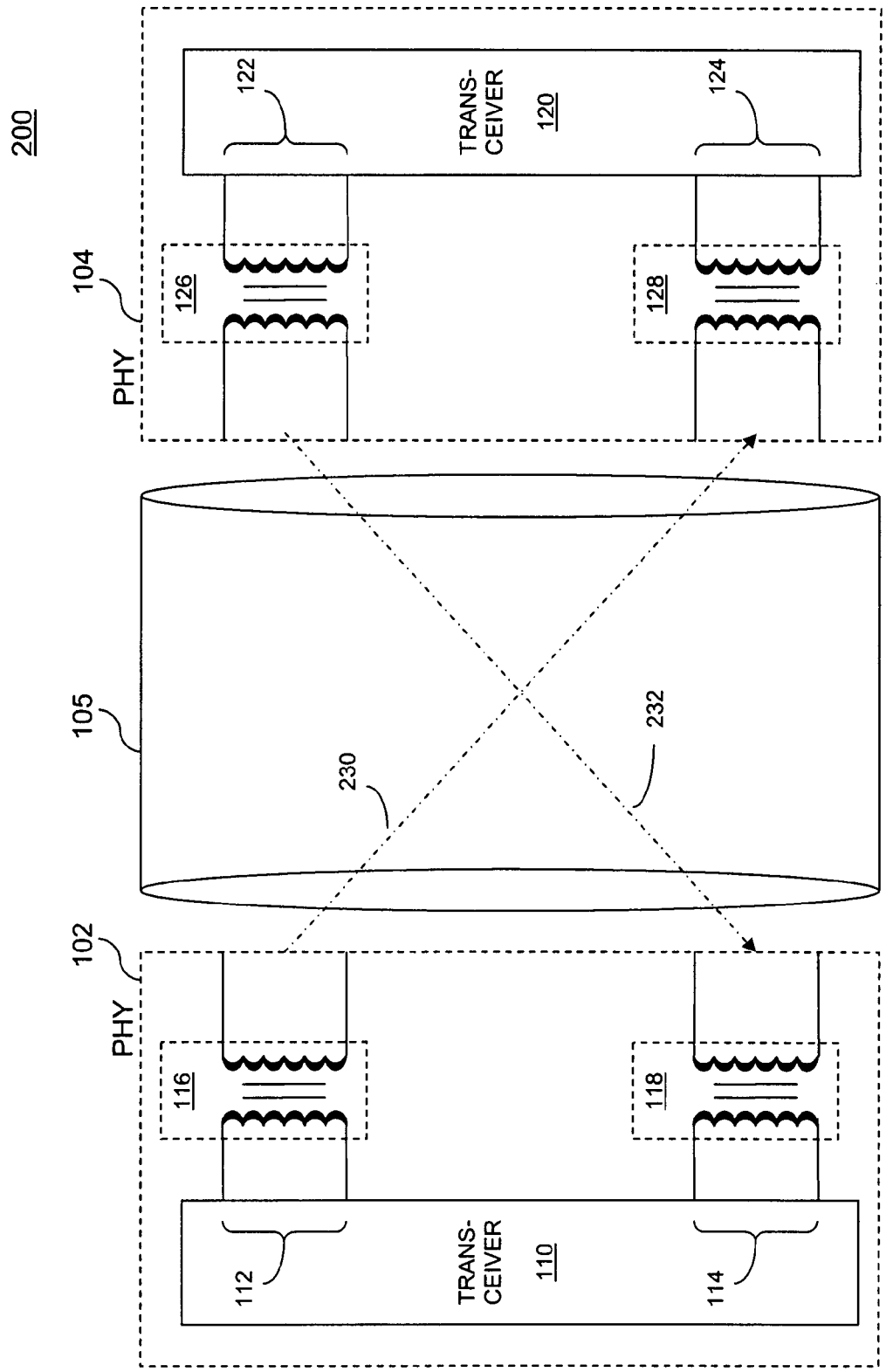
Figure 3:
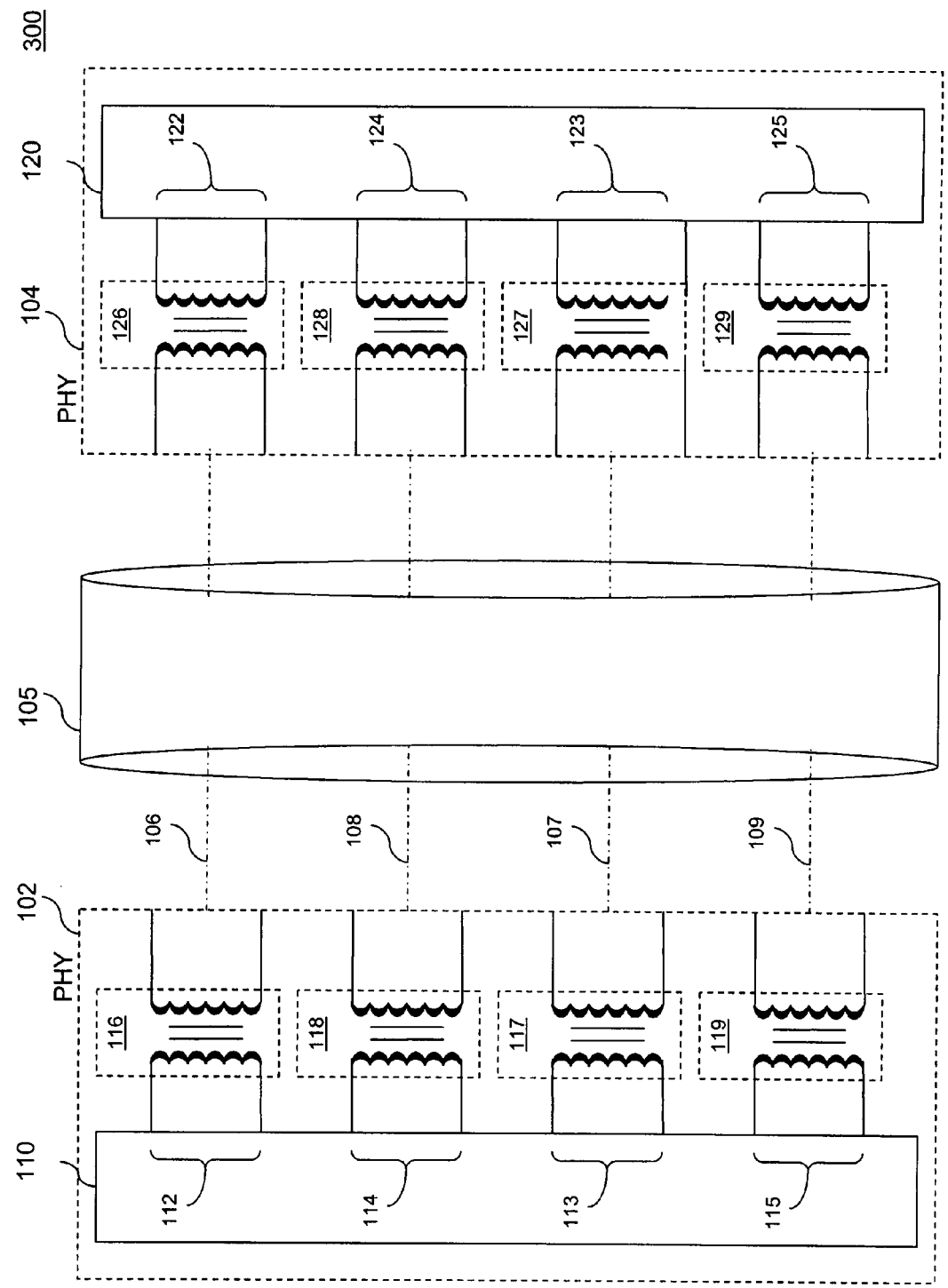

In FIGS. 1 and 2, only two twisted pairs (two channels) are shown for simplicity. In a typical four-wire (four twisted-pair) cable, for 10BaseT or 100BaseT, only two of the twisted pairs are in fact used. For each PHY device, one pair would be used for transmitting, and one pair for receiving. The other two twisted pairs would go unused. For Gigabit communications, however, all four twisted pairs would be used for simultaneous transmitting and receiving. A typical four-wire cable is shown in system 300 of FIG. 3. As can be seen, system 300 is similar to system 100, with the addition of transformers 117 and 119 as channel ports 113 and 115 of transceiver 110, transformers 127 and 129 as channel ports 123 and 125 of transceiver 120, and corresponding communication links 107 and 109.

Figure 4:
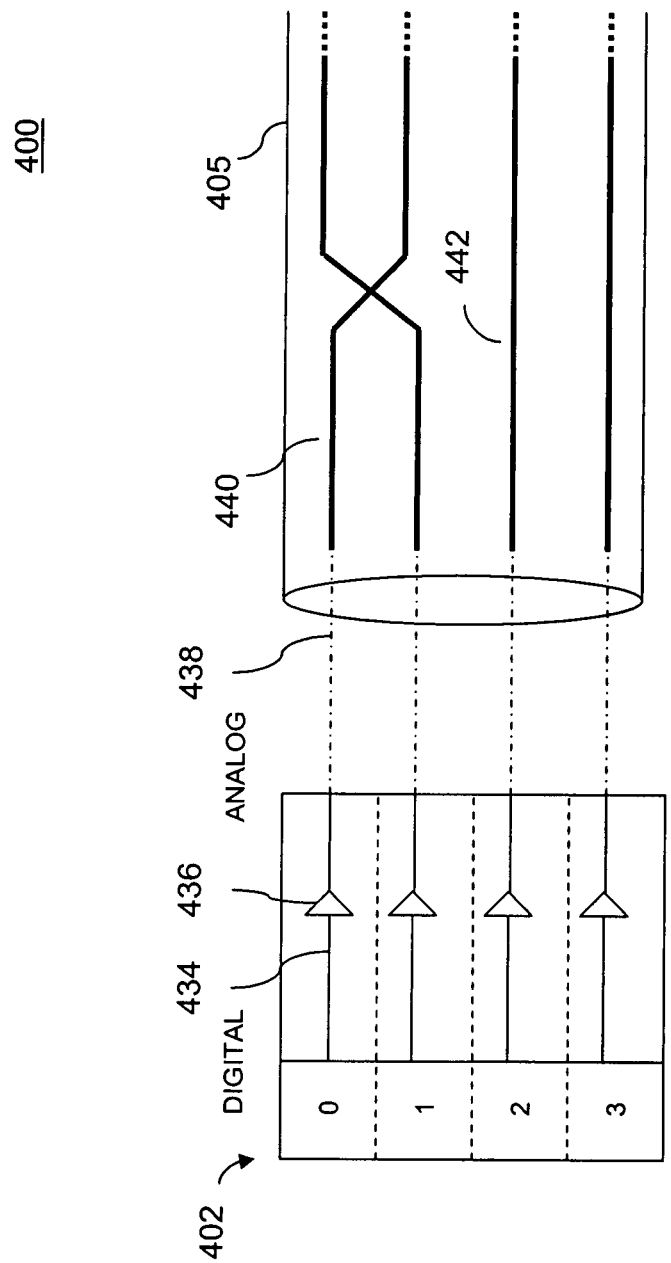
FIG. 4 is a simplified diagram illustrating signal processing channels of a conventional PHY and cable.

FIG. 4 is a simplified diagram 400 showing signal processing channels of a conventional PHY 402 and cable 405. For simplicity, only signal transmission is shown. PHY 402 has four channel ports: 0, 1, 2, and 3. From channel port 0, a digital signal 434 is converted to an analog signal 438 via DAC 436 prior to transmission over twisted pair 440 of cable 405. Twisted pair 440 is shown in FIG. 4 as if it were a part of a crossover cable. However, it could also be a twisted pair of a straight cable, such as twisted pair 442. Both crossover and straight pairs are shown in FIG. 4 for example only. It is unlikely that both would be used in the same cable. When receiving a signal from cable 405, an analog signal would be converted to a digital signal via an ADC (not shown) within PHY 402.

Figure 5:
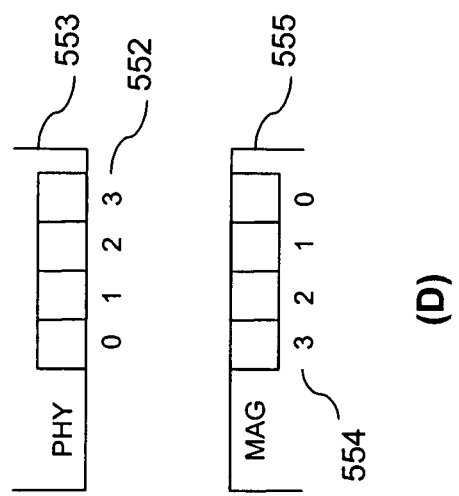
FIGS. 5A-5G illustrate various problem conditions of a cable or chip that would benefit from the present invention.

As described above in the Background section of this document, various problems can occur that will impede or prevent the proper functioning of a conventional Ethernet communications system as just described, which could result in an inoperable system, system failure, or malfunctioning or damaged equipment. The various problems include a variety of cable impairments, board-level miswiring, or even intentional design practices. Examples of these problems are shown in FIG. 5.

In FIGS. 5A-5C, a first PHY 502 is connected to a second PHY 504, via cable 505. In FIG. 5A, channel ports 1 and 2 are swapped at second PHY 504 (see the channel ports referenced by 544). This could result, for example, in unexpected signals received at channel ports 1 and 2 of PHY 504. In FIG. 5B, twisted pairs 546 and 548 are crossed, such that channel port 0 of PHY 502 is connected to channel port 2 of PHY 504 instead of channel port 0 of PHY 504. Similarly, channel port 2 of PHY 502 is connected to channel port 0 of PHY 504 instead of channel port 2 of PHY 504. This crossing is an indication of a possible miswiring within cable 505. This could again result in unexpected signals received. In FIG. 5C, twisted pair 550 is broken, therefore providing no connection between channel port 1 of PHY 502 and channel port 1 of PHY 504.

FIGS. 5D-5G show example chip pinout/connector configurations in which a particular configuration might be different than a user's expectations. This can occur, for example, because transformer formats differ in their connector configurations. For example, in a single-port design such as that shown in FIG. 5D, the channel ordering 552 at the pinout of a PHY chip 553 may be opposite of the channel ordering 554 of the pinout of a magnetics module 555.

FIG. 5E shows a side view of a multiple-port Ethernet implementation involving a multiple-port PHY chip and an RJ45 connector. An RJ45 connector is typically a plastic cable connector that is used to connect UTP Ethernet cables. Each RJ45 socket represents one Ethernet port. In FIG. 5E, a side view of a multiple-port PHY chip 556 is shown with port/channel ordering 557 having ports D, C, B, and A in a single row. A side view of an RJ45 connector 558 is shown with port/channel ordering 559 where ports D, C, B, and A are stacked in two rows of two connectors. The channel ordering within each RJ45 socket is determined by the manufacturer of the connector module and might not correspond with the channel ordering at the pinout of the fixed channel order multiple-port PHY chip. As shown in FIG. 5E, there are channel order mismatches on ports B and D that would necessitate board wiring that may require eight sensitive signals, for example (i.e., one for each mismatched channel), to completely cross over each other. This is both difficult to achieve and potentially damaging to signal quality.

In the top-view example shown in FIG. 5F, single-port channel ordering 560 of the pinout configuration of PHY chip 561 does not align with channel ordering 562 of RJ45 connector (or magnetics module) 563. Similarly, in a multiple-port implementation such as that shown in the top-view example of FIG. 5G, channel ordering 564 of port A of PHY chip 565 aligns with channel ordering 566 of port A of RJ45 connector (or magnetics module) 567. However, channel ordering 568 of port B of PHY chip 565 does not align with channel ordering 569 of port B of RJ45 connector (or magnetics module) 567. In all of these examples, differing user expectations can result in an inoperable or failing system.

Figure 6:
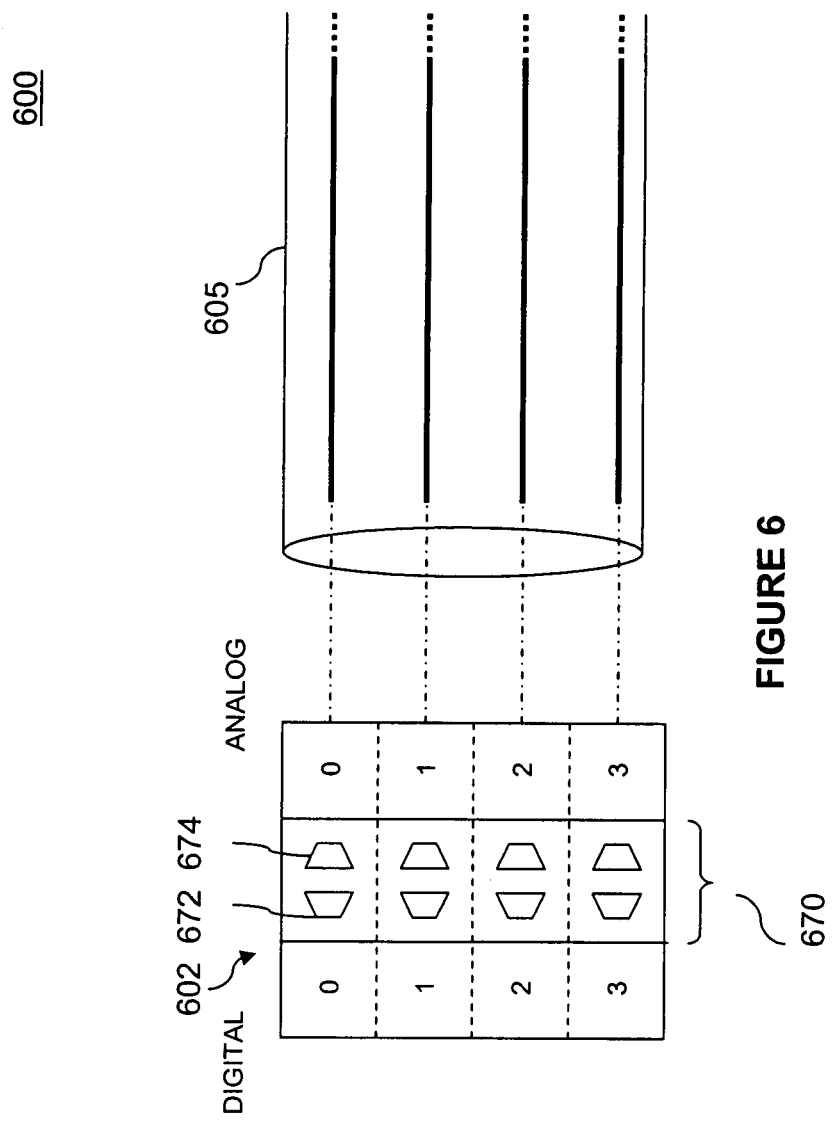
FIG. 6 illustrates a channel-swap crossbar in a PHY, according to an embodiment of the present invention.

One solution that can be used to avoid or correct potential problems, such as those described above, is to provide a switching mechanism to remap a virtual channel designation to an actual channel designation. This can be done with a channel-swap crossbar switch, as will now be described. FIG. 6 is a simplified diagram 600 showing signal processing channels of a PHY 602 and cable 605. In an embodiment of the present invention, PHY 602 includes a channel-swap crossbar switch 670 that operates on one or more digital signals. This occurs in the digital portion of PHY 602. For each channel port of PHY 602, the channel-swap crossbar switch includes at least one multiplexer 672 for selecting a received signal for that particular channel port. In the receive direction of data flow, the channel-swap crossbar switch operates on sampled data words produced by the ADC (not shown) of each channel. Likewise, for each channel port of PHY 602, the channel-swap crossbar switch includes at least one multiplexer 674 for designating an actual channel on which to transmit a particular input signal. In the transmit direction, the channel-swap crossbar switch operates on the symbol streams heading toward the DAC (not shown) of each channel. In an embodiment, each multiplexer receives all of the input signals and selects which one to designate to a particular channel. The change from an input signal's original, or virtual, channel designation to its new actual channel designation is considered a "channel-swap". This "channel-swap" is described further with reference to FIG. 7.

Figure 7:
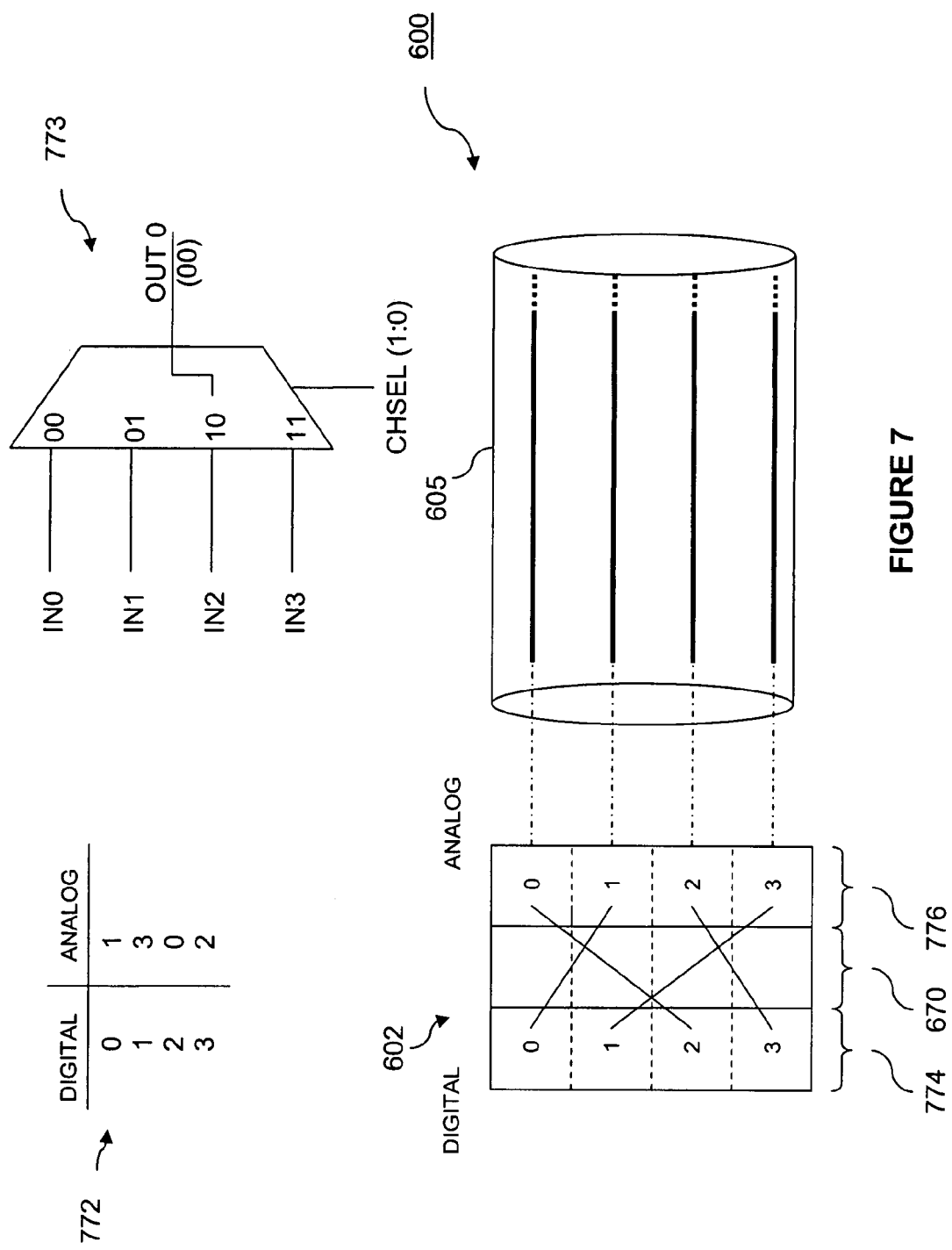
FIG. 7 illustrates channel designation mapping and use of a channel-swap crossbar, according to an embodiment of the present invention.

FIG. 7 shows an example mapping 772 of virtual digital channels 774 mapped to actual analog channels 776. In this example, virtual digital channel 0 is mapped to actual analog channel 1, virtual digital channel 1 is mapped to actual analog channel 3, virtual digital channel 2 is mapped to actual analog channel 0, and virtual digital channel 3 is mapped to actual analog channel 2. This mapping is also shown by lines drawn in PHY 602. This means, for example, that a digital signal coming in at virtual digital channel 2 will be transmitted as an analog signal on actual channel 0 of cable 605, as shown by the example 773, which shows, for example, the first multiplexer 674 (shown in FIG. 6).

Since the example shown in FIG. 7 uses all four channels, it is not appropriate for 10BaseT or 100BaseT communications, which only use two channels. However, one advantage of the present invention is that 10BaseT and 100BaseT communications can be transmitted over any two cable pairs (channels), not only the main two pairs. An example of this is shown in FIG. 8, where only two channels are mapped in mapping 872.

Figure 8:
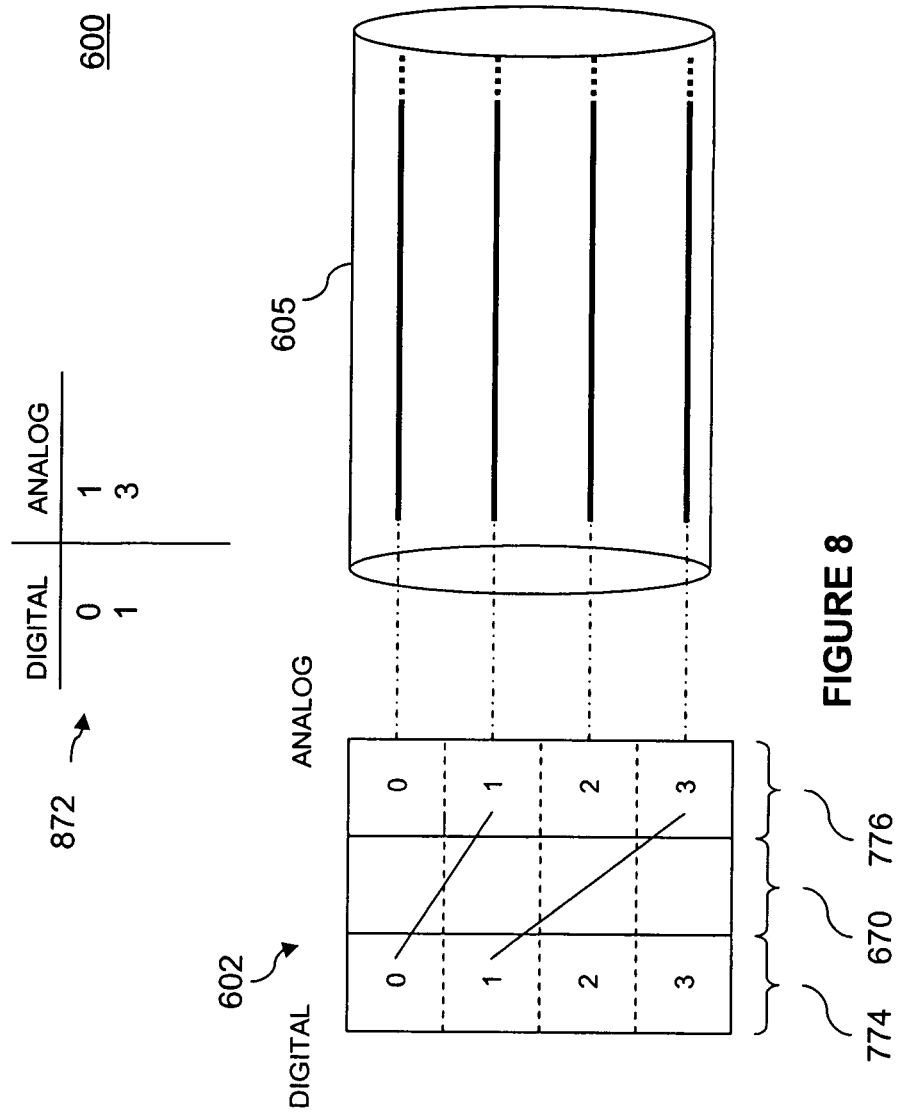
FIG. 8 illustrates channel designation mapping and use of a channel-swap crossbar for 10BaseT or 100BaseT communications, according to an embodiment of the present invention.
Figure 9:
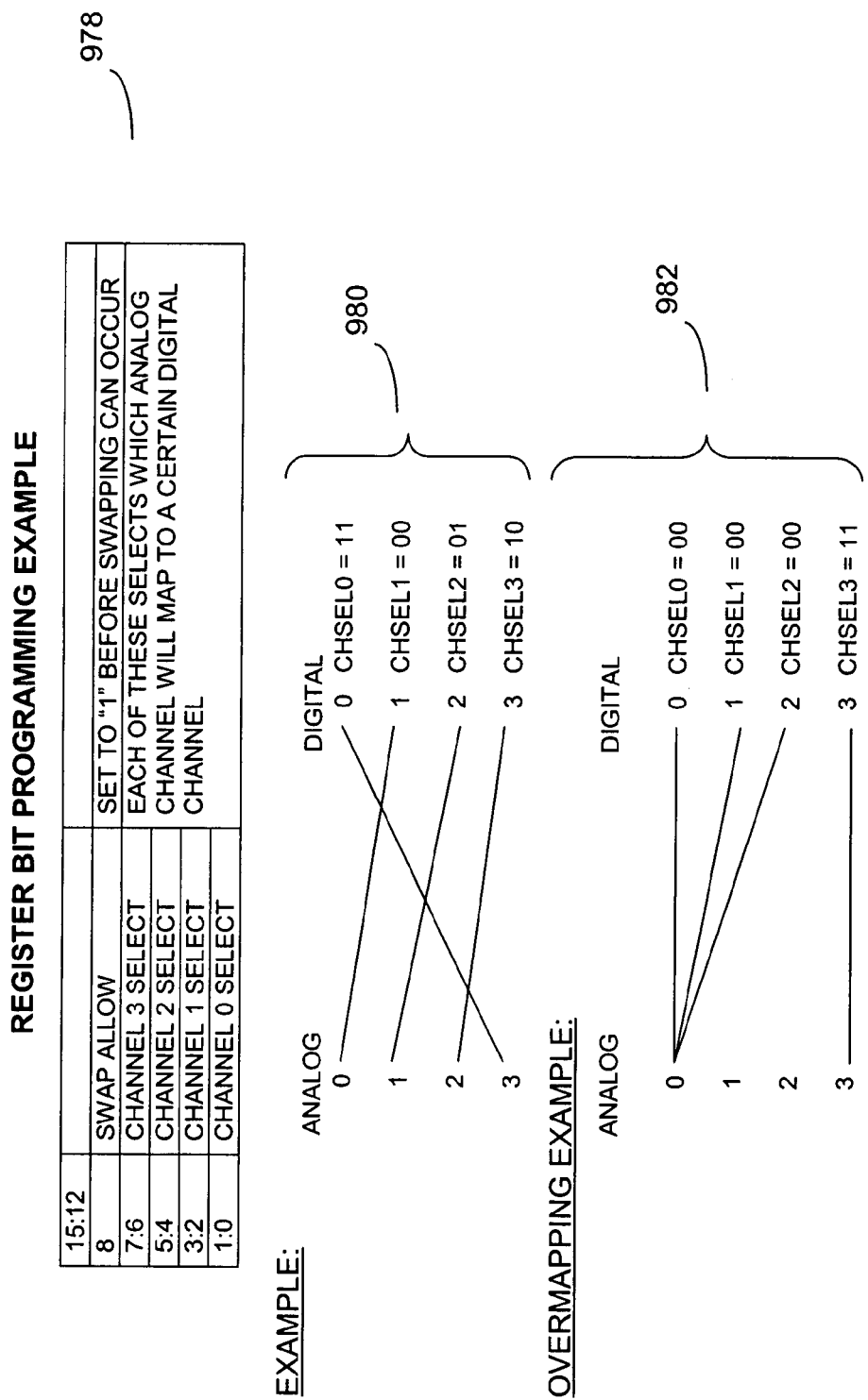
FIG. 9 illustrates a channel designation mapping and programming example, according to an embodiment of the present invention.

The mappings 772/872 shown in FIGS. 7 and 8 can be programmed. For example, the mapping can be controlled by setting on-chip registers. Alternatively, this can be done using chip inputs. An example register bit configuration 978 for mapping channels using the channel-swap crossbar switch is shown in FIG. 9, according to an embodiment of the present invention. As can be seen in the register bit configuration 978, there are four channel selection fields and each channel select designation is two bits. This would be required for a four-channel system, where the four channels 0, 1, 2, and 3 would be designated by bit combinations 00, 01, 10, and 11, respectively. Although a typical Ethernet communications system has four channels, the invention is not to be limited to this. The invention can be easily adapted to handle any number of channels, as would be understood by those skilled in the relevant art(s).

In FIG. 9, mapping example 980 shows the bits to set for a particular mapping. In example 980, in order to map digital (virtual) channel 0 to analog (actual) channel 3, the channel 0 select field is set to 11. To map digital channel 1 to analog channel 0, the channel 1 select field is set to 00. To map digital channel 2 to analog channel 1, the channel 2 select field is set to 01. Finally, to map digital channel 3 to analog channel 2, the channel 3 select field is set to 10. In the examples shown, the mapping assigns an analog channel to each digital channel. However, the invention is not to be limited to this. It would be understood by those skilled in the relevant art(s) that the mapping could be done in the opposite way (i.e., a digital channel could be assigned to each analog channel).

Problems can occur if a channel is overmapped. In FIG. 9, mapping example 982 shows analog channel 0 as being overmapped. In example 982, analog channel 0 is mapped to digital channels 0, 1, and 2. When transmitting, signals coming in on digital channels 0, 1, and 2 will all try to transmit over actual channel 0. When receiving, signals coming in from analog channels 2 and 3 will be ignored. This is a programming error. Effects of this programming error can be prevented by providing logic to detect when overmapping has occurred. The programming error itself can also be prevented by implementing logic that makes it impossible for programming a mapping incorrectly in the first place. However, the details surrounding coding and/or implementation of these types of detection and preventative logic will not be discussed here.

Figure 10:
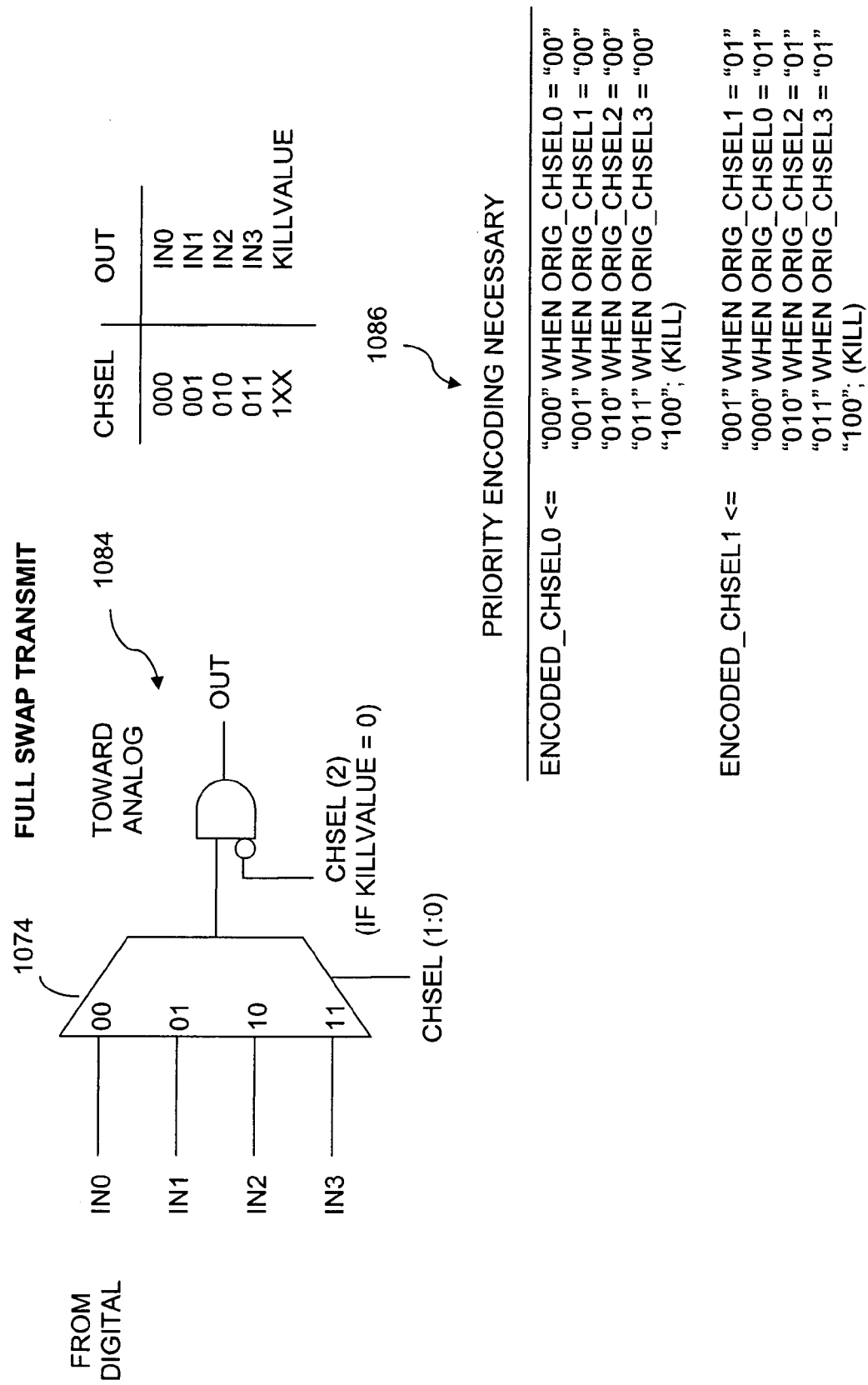
FIG. 10 illustrates a full swap transmit example circuit at a single-channel level, according to an embodiment of the present invention.

FIG. 10 illustrates a full swap transmit example circuit 1084 at a single-channel level, according to an embodiment of the present invention. The multiplexer 1074 can represent one of the multiplexers 674 from FIG. 6, for example. The priority encoding chart 1086 can be used to prioritize the channel mapping in case of overmapping, discussed earlier. In addition, when receiving a signal, a mapping itself (e.g., a mapping defined in a register) is not enough. For example, in a mapping of digital channel 2 to analog channel 1, the channel 2 select field is set to 01 for signal transmission. The setting of bits 01 is equal to the value of 1, which is the analog channel number desired. However, when a signal is received and needs to map the analog channel to a digital channel, the system will not know that the "channel 2 select field" of the register represents digital channel 2 without further logic. The priority encoding chart 1086 can be used to address this. A kill value is available if a channel is not to be assigned.

Figure 11:
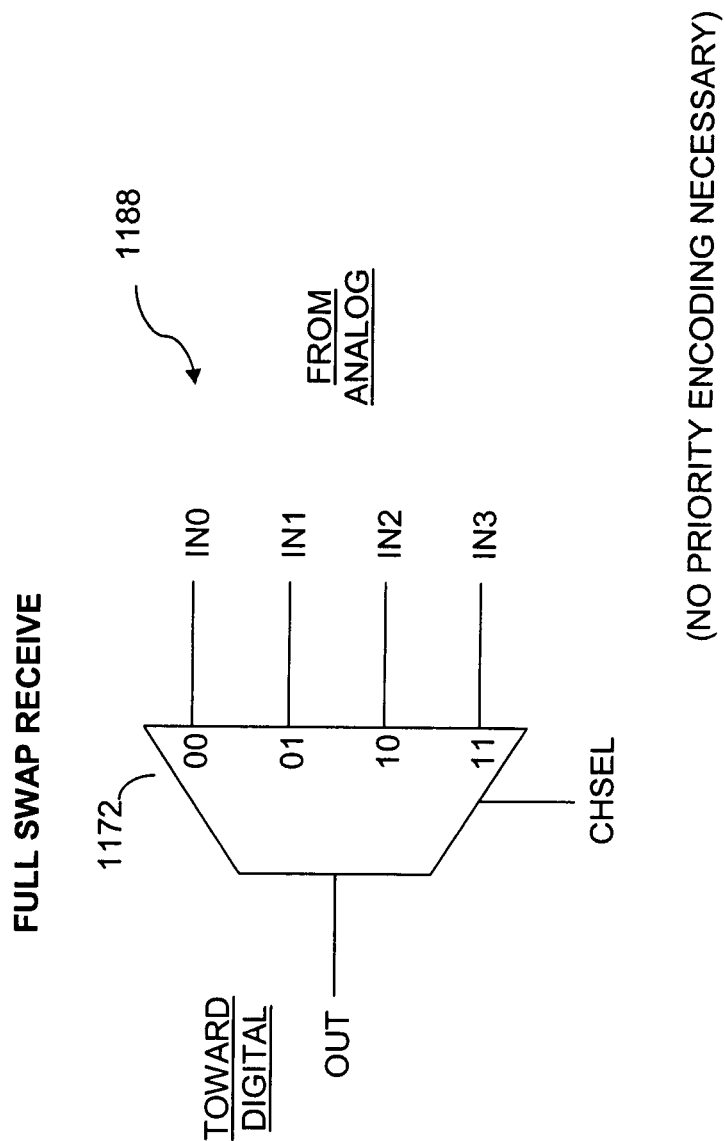
FIG. 11 illustrates a full swap receive example circuit at a single-channel level, according to an embodiment of the present invention.

FIG. 11 illustrates a full swap receive example circuit 1188 at a single-channel level, according to an embodiment of the present invention. The multiplexer 1172 can represent one of the multiplexers 672 from FIG. 6, for example.

Figure 12:
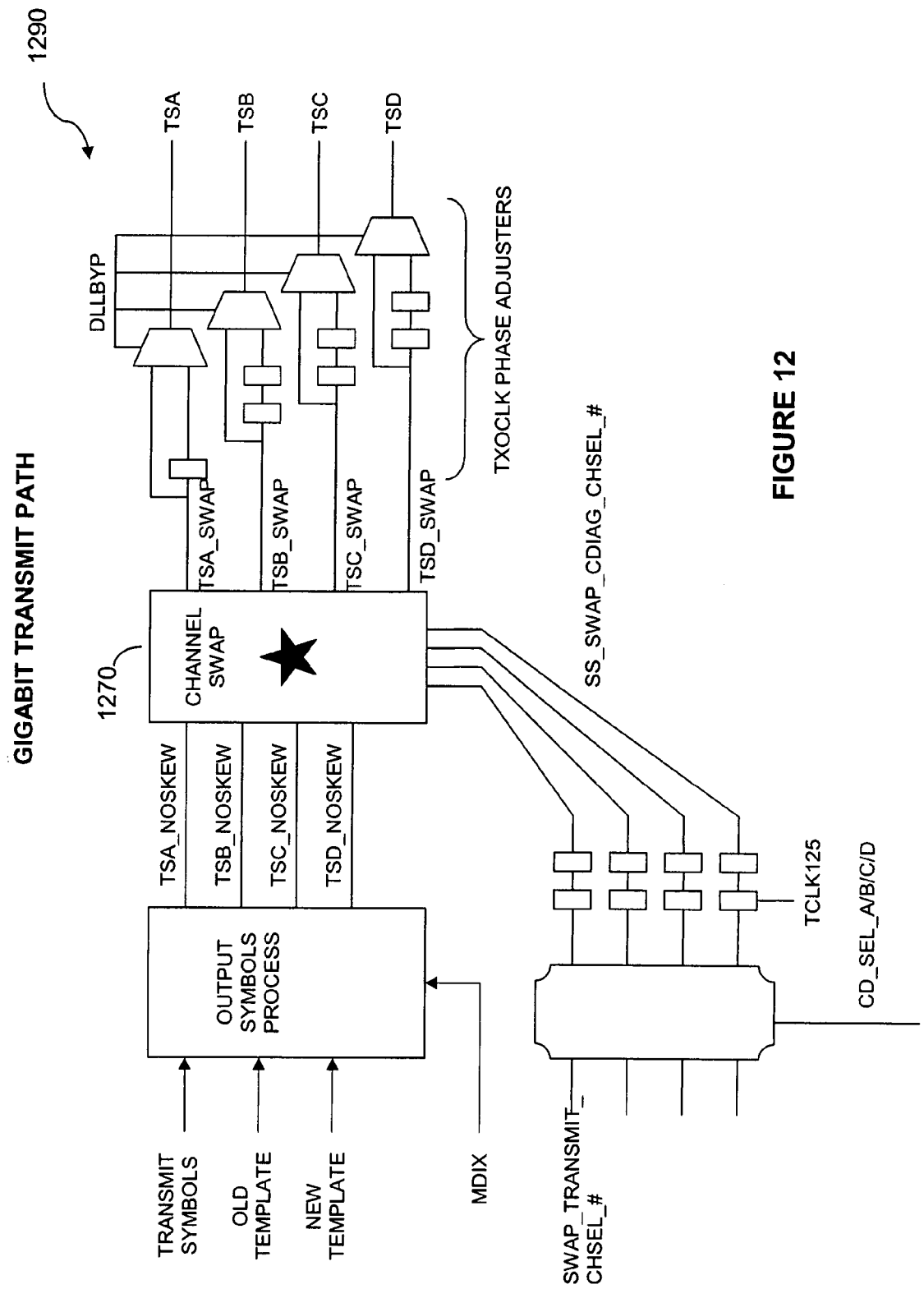
FIG. 12 illustrates a Gigabit transmit path circuit, according to an embodiment of the present invention.

FIG. 12 illustrates a transmit path circuit 1290 used for Gigabit communications, according to an embodiment of the present invention. Transmit path circuit 1290 includes channel-swap crossbar switch 1270. Channel-swap crossbar switch 1270 can represent a transmit portion of channel-swap crossbar switch 670 of FIG. 6, for example.

Figure 13:
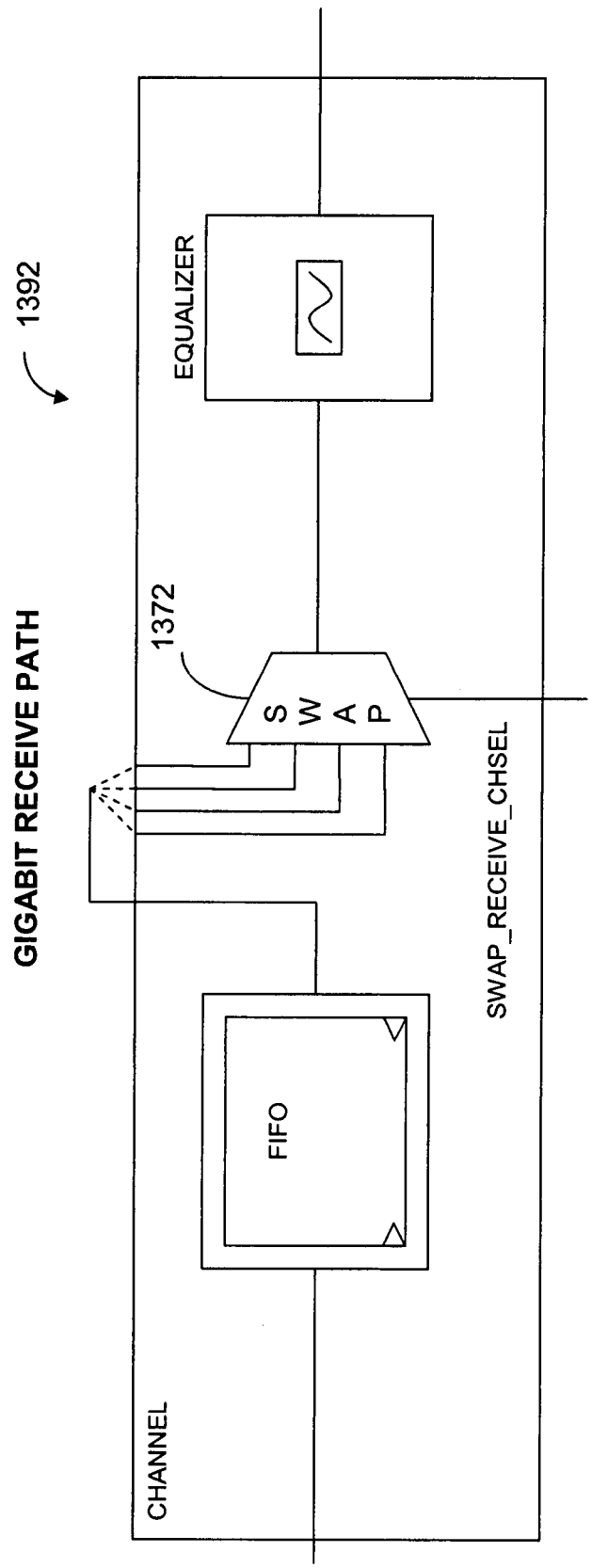
FIG. 13 illustrates a Gigabit receive path circuit for a particular single channel, according to an embodiment of the present invention.

FIG. 13 illustrates a receive path circuit 1392 used for Gigabit communications for a particular single channel, according to an embodiment of the present invention. Receive path circuit 1392 includes multiplexer 1372. Multiplexer 1372 can represent a multiplexer 672 of a channel-swap crossbar switch 670 (shown in FIG. 6), for example.

Receive circuits require more complexity than transmit circuits. The transmit symbols that enter a DAC prior to transmission are small—two or three bits, depending on the speed of operation. However, the receive symbols that exit an ADC can be much larger (e.g., 8-bit words or greater), and these received symbols contain a lot of noise, which needs to be lessened or removed. Therefore, further logic is needed when receiving signals to handle further control signal processing needs. Control signal processing, as used in this document, refers to digital signal processing techniques that are used to control many properties of signal recovery algorithms. Examples of control signal processing include automated gain control (AGC) loops for programmable gain amplifiers (PGA), clock phase recovery loops, and the like.

Figure 14:
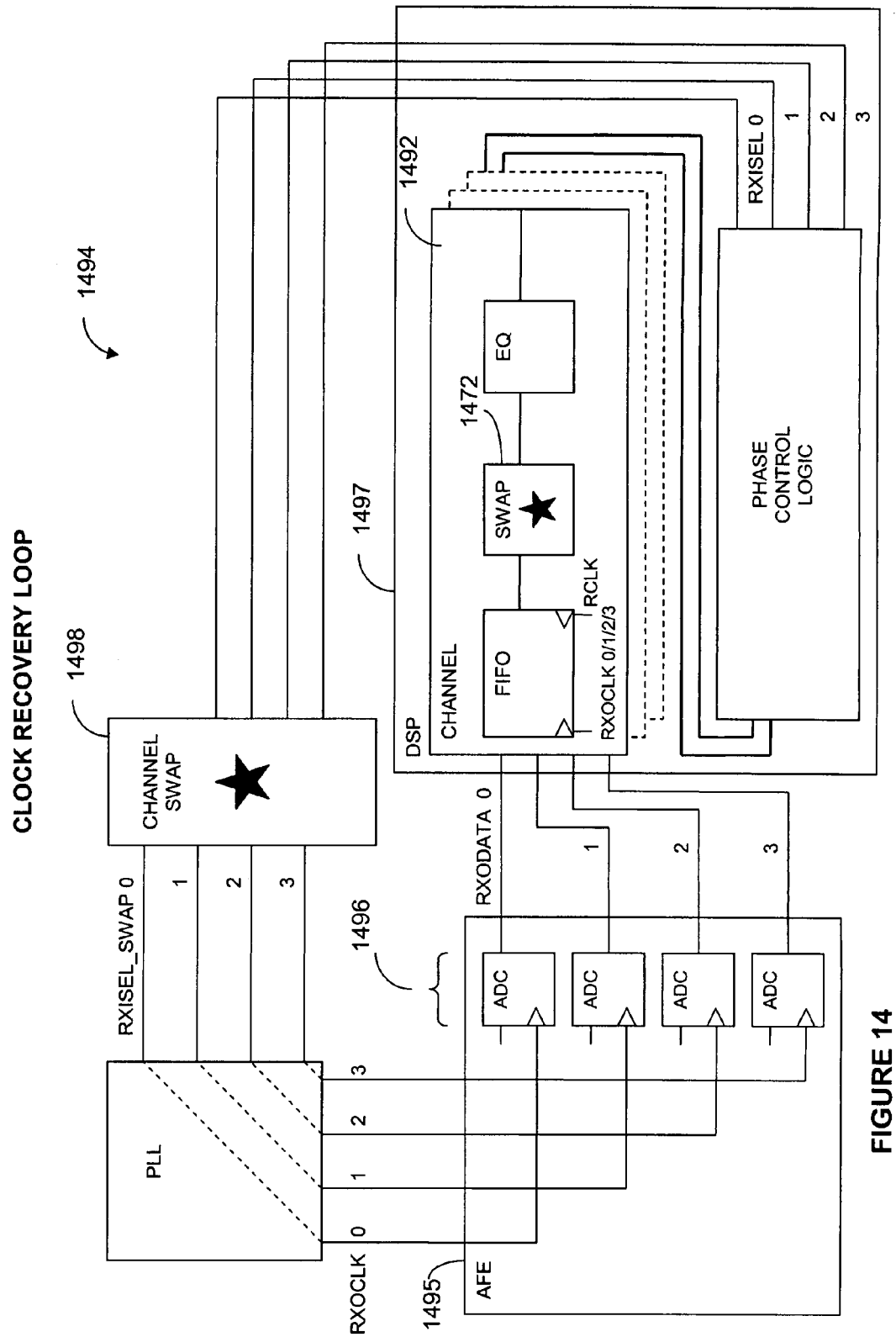
FIG. 14 illustrates a clock recovery loop, according to an embodiment of the present invention.

One such logic circuit for handling further control signal processing is the clock recovery loop circuit 1494 shown in FIG. 14. After analog signals are received at analog front end (AFE) 1495, they are converted to digital signals using ADCs 1496. The resulting digital words could be large (e.g., 8-bit words). The digital words then enter digital signal processing block 1497. For each channel, each digital word enters its own receive path circuit 1492, where channel swapping occurs at its own multiplexer 1472 and noise introduced by the analog channel is removed. In further processing, a phase control word is selected for timing purposes. However, phase control is an analog control, so the phase control word is mapped back to the analog domain using channel-swap crossbar 1498.

Figure 15:
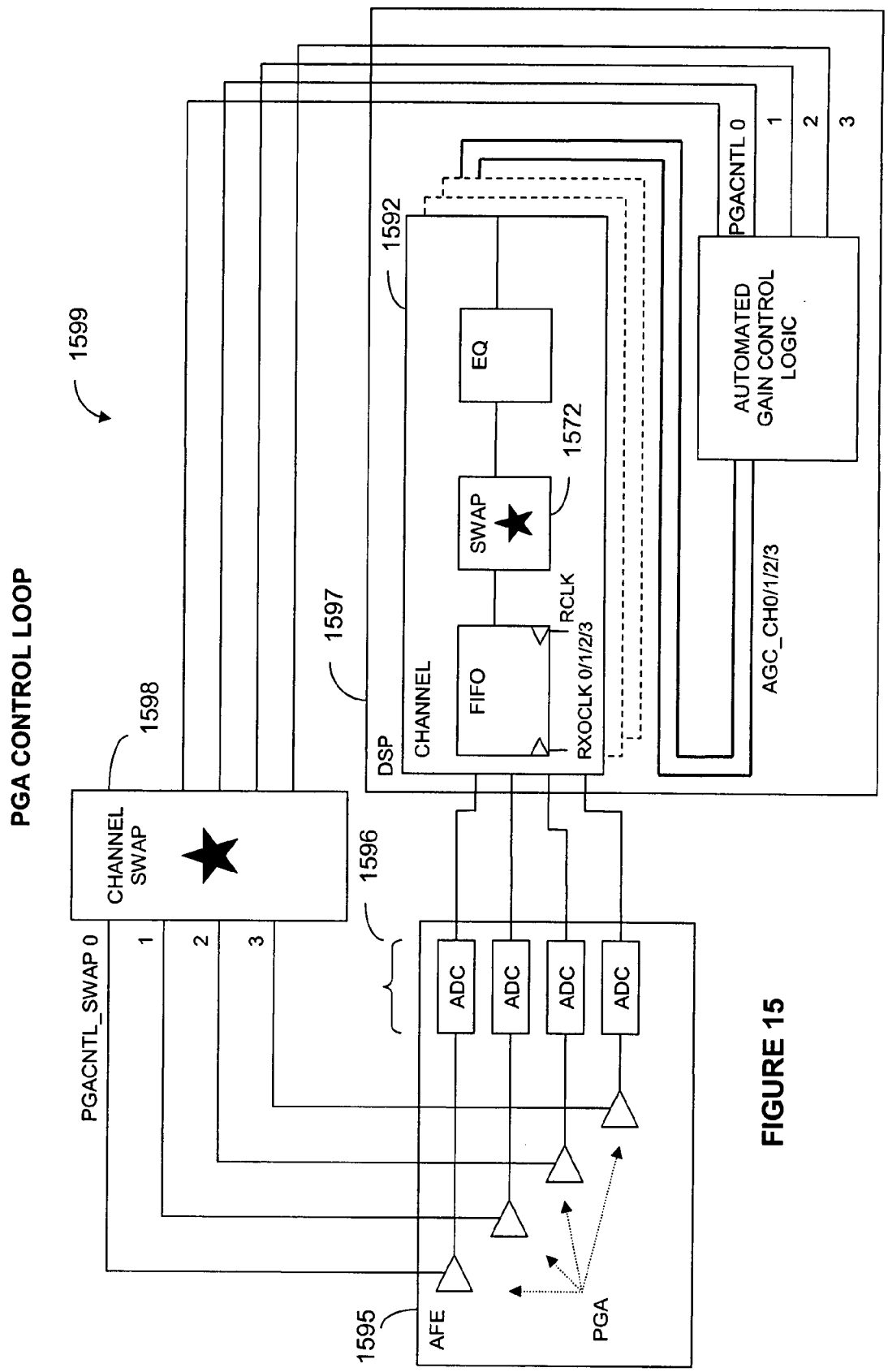
FIG. 15 illustrates a programmable gain amplifier (PGA) control loop, according to an embodiment of the present invention.

Another such logic circuit for handling further control signal processing is the programmable gain amplifier control loop circuit 1599 shown in FIG. 15. After analog signals are received at analog front end (AFE) 1595, they are converted to digital signals using ADCs 1596. Again, the resulting digital words could be large (e.g., 8-bit words). The digital words then enter digital signal processing block 1597. For each channel, each digital word enters its own receive path circuit 1592, where channel swapping occurs at its own multiplexer 1572 and noise introduced by the analog channel is removed. In further processing, an automated gain control (AGC) control word is selected for attenuation control. The AGC control word tells AFE 1595 how much to attenuate the signal that's coming in. If the signal is very large, it tells it to attenuate it a lot in order to make it as small as possible so that it does not overwhelm digital processing block 1597. However, attenuation control is an analog control, so the AGC control word is mapped back to the analog domain using channel-swap crossbar 1598.

As stated earlier, the present invention can be useful in avoiding or correcting potential problems including misconfiguration of channel ports, miswiring of a board or cable, faulty or broken wires in a cable, and user expectation. However, there are many other potential uses for the channel-swap cross-bar switch. For example, for data security purposes, data can be rerouted onto another channel so that sensitive data does not flow on an expected channel. A further example is time domain reflectometry (TDR). Time domain reflectometry is a way to characterize a communications system and detect possible problems in the system or cable. In general terms, with time domain reflectometry, a signal is driven on one channel, and its reflection, or return signal, is expected on the same or another channel. In the detected reflection or return signal, a variety of properties and characteristics can be determined. For example, the cable length, a break in the cable, or proper cable termination can be determined. In addition, crosstalk—a property of transmission data on one wire affecting a near wire to some degree—can be determined. A benefit of using the present invention with time domain reflectometry is that the channel(s) used for transmission and the channel(s) used for detection can be very well controlled.

Figure 16:
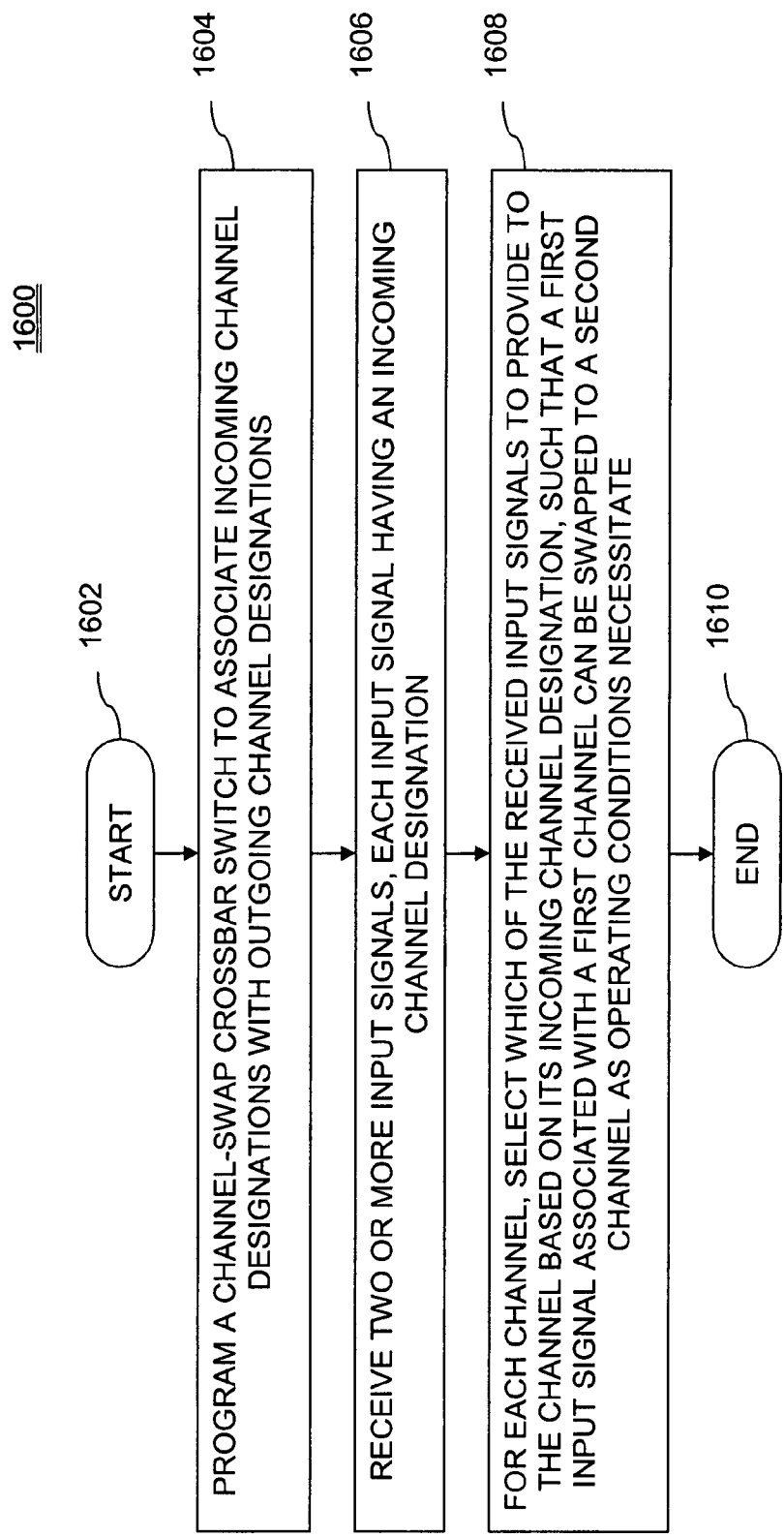
FIG. 16 is a flowchart that illustrates a method 1600 of channel-swapping in an Ethernet PHY communications system, according to an embodiment of the present invention.
Figure 17:
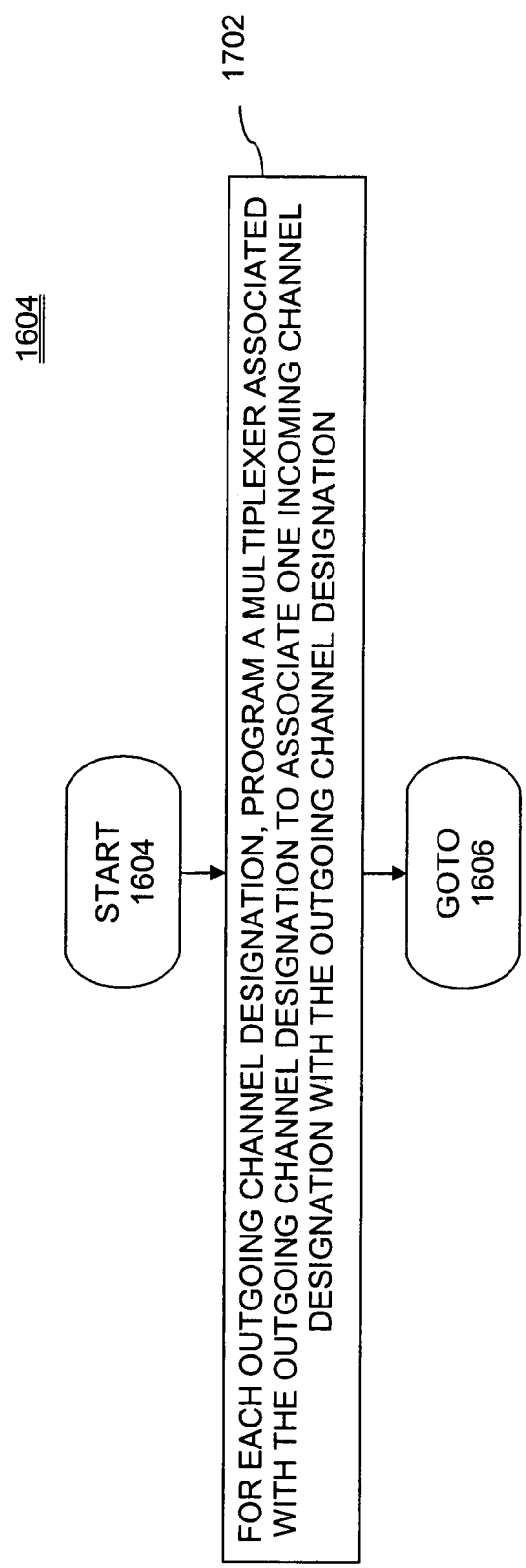
FIG. 17 is a flowchart illustrating step 1604 of method 1600, according to an embodiment of the present invention.

FIG. 16 is a flowchart describing a method 1600 of channel-swapping in an Ethernet PHY communications system, according to an embodiment of the present invention. Method 1600 starts at step 1602. In step 1604, a channel-swap crossbar switch is programmed to associate incoming channel designations with outgoing channel designations. In an embodiment, the channel-swap crossbar switch consists of multiplexers such that each multiplexer is associated with an outgoing channel designation, as described above with reference to FIGS. 6-11. The programming of the channel-swap crossbar switch of step 1604 can be done by programming each multiplexer to associate one of the incoming channel designations to the multiplexer's outgoing channel designation, as shown in FIG. 17 (step 1702). This programming can be done by setting register bits or setting chip inputs (e.g., pins), for example. In step 1606, two or more input signals are received, each input signal having an incoming channel designation. For each channel, one of the received input signals is selected to be provided to the channel based on its incoming channel designation in step 1608. Method 1600 ends at step 1610.

According to method 1600, a first input signal associated with a particular channel can be swapped to another channel as operating conditions necessitate. As discussed above, these operating conditions can include maintaining a specific channel order, inconsistent connector types, a broken wire or an incorrectly built cable, differences in transformer formats, etc. When any of these types of conditions are detected or known, method 1600 can be used to work around them by rerouting transmissions onto other channels. Method 1600 can also be used intentionally, rather than to correct or avoid a problem. For example, method 1600 can be used to protect a sensitive data transmission by changing its routing to an unexpected channel. In addition, method 1600 can be used for controlling the channels used for time domain reflectometry.

Figure 18:
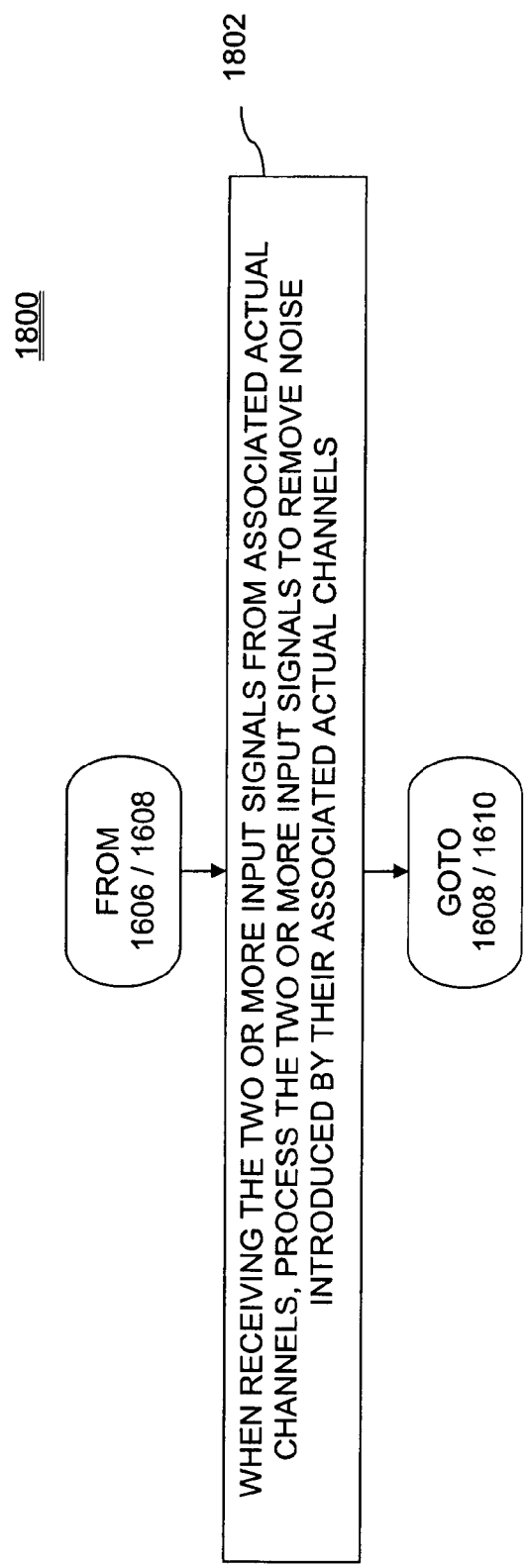
FIGS. 18 and 19 are flowcharts that each illustrate a further step of method 1600, with regard to receiving signals at a PHY from an actual channel, according to an embodiment of the present invention.

FIG. 18 is a flowchart 1800 that illustrates a further step of method 1600, with regard to receiving signals from an actual channel, according to an embodiment of the present invention. After two or more input signals are received in step 1606 as "received" signals from an actual (analog) channel, the signals are processed in step 1802 to remove noise that may have been introduced by their associated actual channels. This can occur after step 1606 or 1608. The method then returns to step 1608 or 1610 of method 1600.

Figure 19:
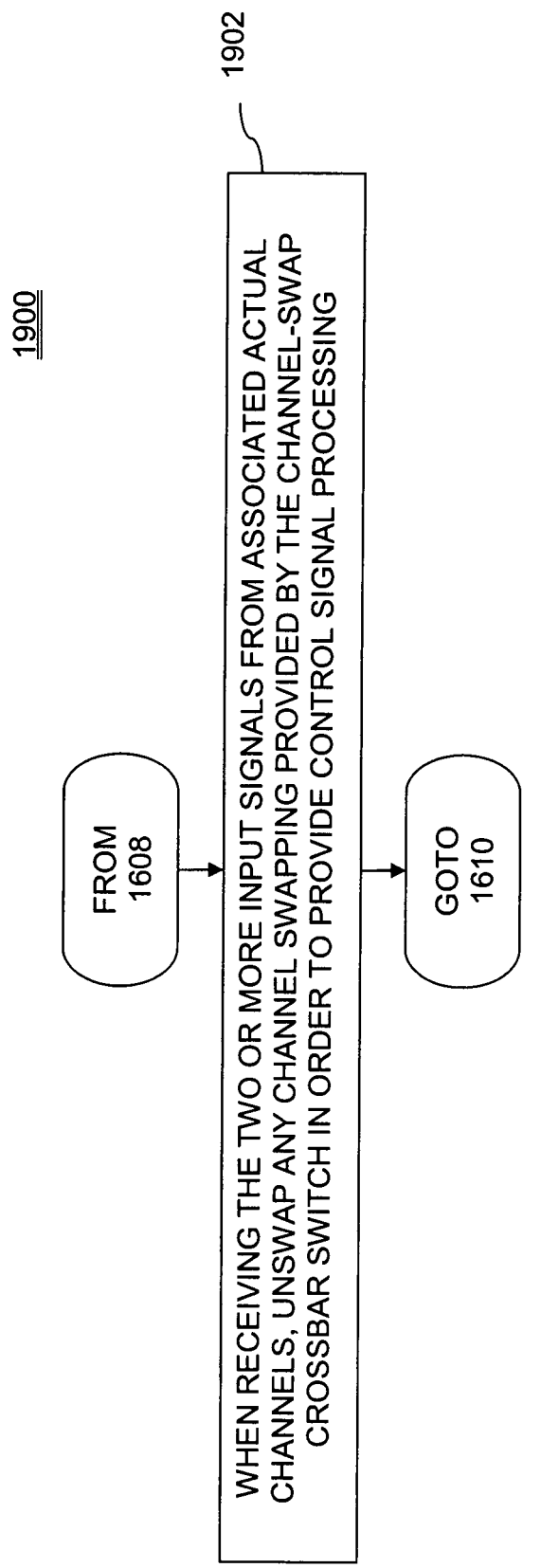

FIG. 19 is a flowchart 1900 that illustrates another further step of method 1600, with regard to receiving signals from an actual channel, according to an embodiment of the present invention. After two or more input signals are received in step 1606 as "received" signals from an actual (analog) channel, and after any channel-swapping (to the digital domain) is done in step 1608, channel-swapping of step 1608 is undone in step 1902 in order to provide control signal processing. The method then continues at step 1610. This 'unswapping' is done when certain control signal processing needs to be done in the analog domain. Examples of control signal processing needs that require this are clock recovery and PGA control. An example of this 'unswapping' is illustrated in FIG. 20.

Figure 20:
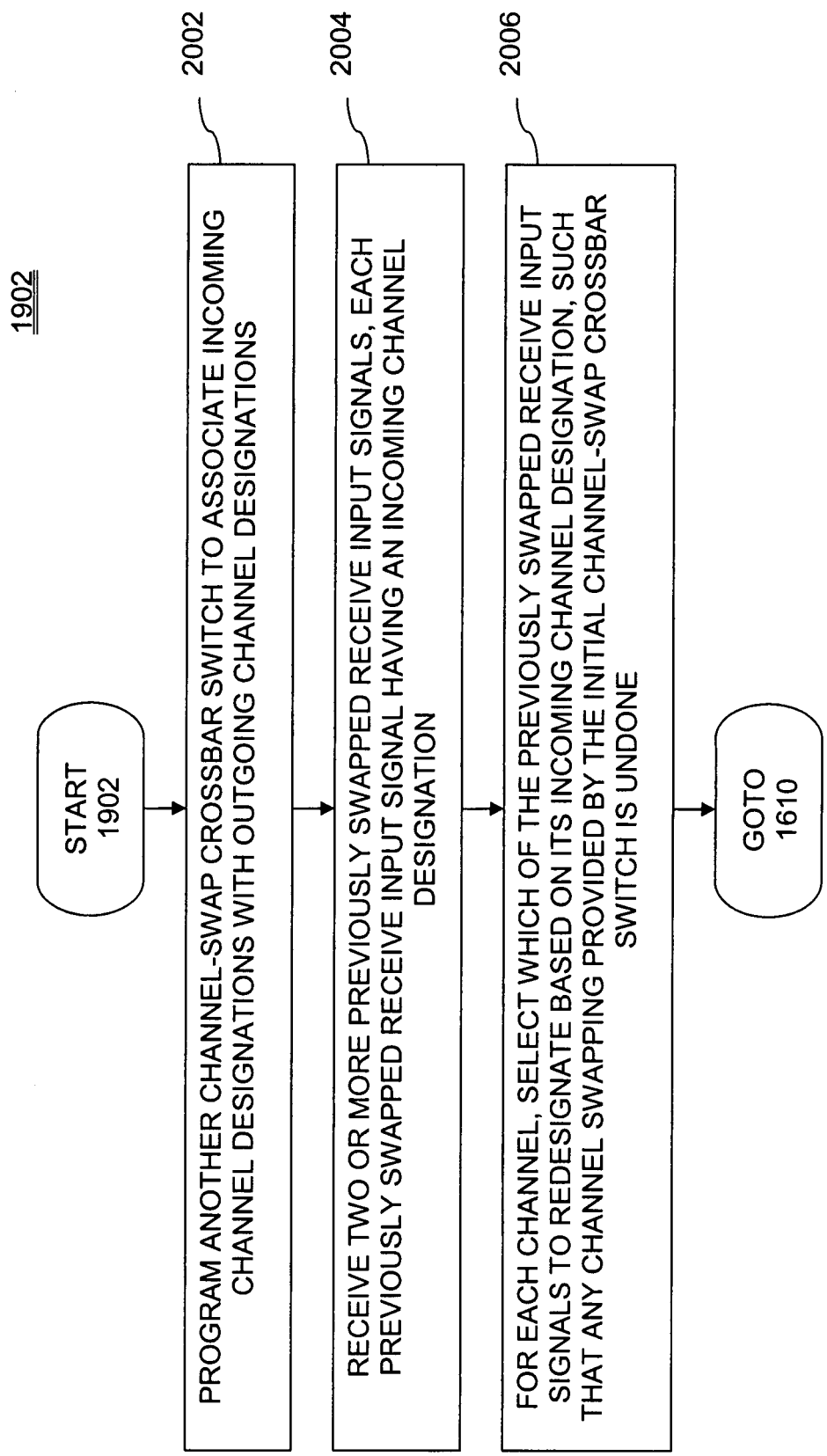
FIG. 20 is a flowchart illustrating step 1902, with regard to unswapping channels in order to process control signals, according to an embodiment of the present invention.

FIG. 20 is a flowchart illustrating step 1902, with regard to unswapping channels in order to process control signals, according to an embodiment of the present invention. In step 2002, another channel-swap crossbar switch is programmed to associate incoming channel designations with outgoing channel designations. In step 2004, two or more previously swapped receive input signals are received, each previously swapped receive input signal having an incoming channel designation. The term "previously swapped" is not meant to imply that a particular receive signal was actually swapped by the initial channel-swap cross-bar switch. Rather, what is meant is that it was previously processed by the initial channel-swap crossbar switch, whether or not any channel swapping actually occurred. For each channel, one of the previously swapped received input signals is selected to be provided to the channel based on its incoming channel designation in step 2006. The method then returns to step 1610.

The present invention has been described as operating on digital signals within the digital portion of a PHY device. However, the invention is not to be limited to digital implementations, nor is the invention to be limited to being necessarily located within a PHY device. While the channel-swap crossbar function can be implemented in either the analog or digital domains, a digital implementation has the following advantages. First, digital pathways are more robust. Digital circuitry is much less sensitive to process and temperature. Any additional loading of switches needed to perform the channel-swap crossbar on analog pathways would make the implementation of the DAC and ADC more challenging. Second, there is minimal impact on silicon area and power consumption with a digital implementation. As the transistor feature size in the digital portion of a chip continues to drop, the analog portion tends to consume an ever larger percentage of the total space. An analog implementation of the channel-swap crossbar switch would likely consume more silicon area than a corresponding digital implementation, and the disparity could grow even larger in future generations. Third, a digital implementation is likely to be more portable to future generations. In addition to the area and power savings, digital implementations are inherently much easier to pass along from one generation of silicon to the next. Finally, because testability circuits were previously implemented in digital portions of a chip, it would be easier to debug any problems with a digital implementation of the channel-swap crossbar switch than an analog implementation.

A full channel-swap crossbar for use in Ethernet PHY communications systems has just been described. The channel-swap crossbar provides a way to easily correct for miscoupling and/or misconfiguration of Ethernet PHY interfaces. Advantages of the channel-swap crossbar include allowing full reconfiguration of cable pairs for Gigabit communications, where any physical (actual) channel can be mapped to any virtual channel. Cable pair order can be reversed easily, which eases silicon layout or board layout difficulties. In addition, it allows 10BaseT or 100BaseT communications to operate on any two cable pairs, not only on the main two cable pairs. Further, the channel-swap crossbar can be used for data security in that data can be transmitted on an unexpected channel, and it can be used to control the channels used for time domain reflectometry.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A programmable channel-swap crossbar switch for swapping signal flow from one channel to another within an Ethernet physical layer device (PHY), the programmable channel-swap crossbar switch comprising:

two or more programmed multiplexers, each multiplexer configured to receive two or more input signals and to select which one of the two or more input signals to pass to a mapped corresponding channel, such that a first input signal associated with a first channel can be swapped to a second channel as operating conditions necessitate;

wherein all of the two or more input signals received at each multiplexer of the two or more programmed multiplexers are either transmit input signals having a transmit data flow direction or receive input signals having a receive data flow direction; and wherein a first of the two or more programmed multiplexers is configured to select from only the transmit input signals to provide the mapped corresponding channel, and wherein a second of the two or more programmed multiplexers is configured to select from only the receive input signals to the mapped corresponding channel.

2. The programmable channel-swap crossbar switch of claim 1, wherein the two or more input signals are digital input signals.

3. The programmable channel-swap crossbar switch of claim 1, wherein the first channel is a virtual channel and the second channel is an actual channel.

4. The programmable channel-swap crossbar switch of claim 1, wherein the first channel is an actual channel and the second channel is a virtual channel.

5. The programmable channel-swap crossbar switch of claim 1, wherein the mapped corresponding channel for each multiplexer corresponds to a specific actual channel within an Ethernet cable.

6. The programmable channel-swap crossbar switch of claim 5, wherein each actual channel of the Ethernet cable comprises an unshielded twisted pair cable.

7. The programmable channel-swap crossbar switch of claim 5, wherein the Ethernet cable is a straight cable.

8. The programmable channel-swap crossbar switch of claim 5, wherein the Ethernet cable is a crossover cable.

9. The programmable channel-swap crossbar switch of claim 1, wherein the two or more input signals comprise 10BaseT communications.

10. The programmable channel-swap crossbar switch of claim 1, wherein the two or more input signals comprise 100BaseT communications.

11. The programmable channel-swap crossbar switch of claim 1, wherein the two or more input signals comprise Gigabit communications.

12. The programmable channel-swap crossbar switch of claim 1, wherein the two or more programmed multiplexers comprise four programmed multiplexers each corresponding to one of four channels.

13. The programmable channel-swap crossbar switch of claim 12, wherein the four programmed multiplexers are two-bit selection multiplexers that select from channels 0, 1, 2, and 3.

14. The programmable channel-swap crossbar switch of claim 1, wherein the two or more programmed multiplexers are programmed with register control bits.

15. The programmable channel-swap crossbar switch of claim 1, wherein the two or more programmed multiplexers are programmed with chip inputs.

16. The programmable channel-swap crossbar switch of claim 1, wherein the operating conditions that can necessitate channel-swapping include one or more of:
channel order;
connector type;
user expectation;
broken wire;
incorrectly built cable;
transformer format;
data security; and
time domain reflectometry.

17. A signal processing system within a multiple-channel Ethernet physical layer device (PHY) communication system, the signal processing system comprising, for each channel:
a transmit path that includes a transmit crossbar switch configured to receive two or more transmit input signals at corresponding inputs of a first multiplexer and to select which one of the two or more transmit input signals to pass to the channel, such that a particular transmit input signal associated with a particular transmitting channel can be swapped to another channel as operating conditions necessitate, wherein the first multiplexer is configured to select from only the two or more transmit input signals, and wherein the two or more transmit input signals have a transmit data flow direction; and
a receive path that includes a receive crossbar switch configured to receive two or more receive input signals at corresponding inputs of a second multiplexer and to select which one of the two or more receive input signals to pass, such that a particular receive input signal associated with a particular receiving channel can be swapped to another channel as operating conditions necessitate, wherein the second multiplexer is configured to select only from the two or more receive input signals, and wherein the two or more receive input signals have a receive data flow direction.

18. The signal processing system of claim 17, wherein the receive path further comprises an additional receive crossbar switch that unswaps any channel swapping provided by the initial receive crossbar switch in order to provide control signal processing.

19. A method of channel-swapping in an Ethernet physical layer device (PHY) communications system, the method comprising:
programming a channel-swap crossbar switch to associate incoming channel designations with outgoing channel designations;
receiving two or more input signals, each input signal having an incoming channel designation;
for each channel of the communications system, selecting which of the received input signals to provide to a channel based on its incoming channel designation, such that a first input signal associated with a first channel can be swapped to a second channel as operating conditions necessitate; and
when receiving the two or more input signals from associated actual channels, processing the two or more input signals to remove noise introduced by their associated actual channels.

20. The method of claim 19, wherein programming a channel-swap crossbar switch comprises, for each outgoing channel designation:
programming a multiplexer associated with the outgoing channel designation to associate one incoming channel designation with the outgoing channel designation.

21. The method of claim 20, wherein programming a multiplexer comprises:
setting register control bits.

22. The method of claim 20, wherein programming a multiplexer comprises:
setting chip inputs.

23. The method of claim 19, further comprising, when receiving the two or more input signals from associated actual channels:
unswapping any channel swapping provided by the channel-swap crossbar switch in order to provide control signal processing.

24. The method of claim 23, wherein the unswapping comprises:
programming another channel-swap crossbar switch to associate incoming channel designations with outgoing channel designations;
receiving two or more previously swapped receive input signals, each previously swapped receive input signal having an incoming channel designation;
for each channel of the communications system, selecting which of the previously swapped receive input signals to redesignate based on its incoming channel designation, such that any channel swapping provided by the channel-swap crossbar switch is undone.

25. The programmable channel crossbar of claim 1, wherein, for transmit input signals, the second channel corresponds to a particular twisted pair in an Ethernet cable having a number of twisted pair.

26. The method of claim 19, wherein, for a transmit path, the channel corresponds to a particular twisted pair in an Ethernet cable having a number of twisted pair that define a number of corresponding channels of the Ethernet cable.

27. A signal processing system within a multiple-channel Ethernet physical layer device (PHY) communication system, the signal processing system comprising, for each channel of a corresponding Ethernet cable:
- a transmit path that includes a transmit crossbar switch programmed to receive two or more transmit input signals at corresponding inputs of a multiplexer and to select which one of the two or more transmit input signals to pass to the channel, such that a particular transmit input signal associated with a particular transmitting channel can be swapped to another channel as operating conditions necessitate, and wherein the two or more transmit input signals have a transmit data flow direction; and
- wherein the transmit crossbar switch is programmed to select only from the two or more transmit input signals.

28. The signal processing system of claim 27, wherein the channel corresponds to a particular twisted pair in an Ethernet cable having a number of twisted pair that define a number of corresponding actual channels of the Ethernet cable.

* * * * *